United States Patent
Chang et al.

(10) Patent No.: US 12,200,792 B2
(45) Date of Patent: Jan. 14, 2025

(54) COMMUNICATION METHOD AND APPARATUS

(71) Applicant: HUAWEI TECHNOLOGIES CO., LTD., Shenzhen (CN)

(72) Inventors: Junren Chang, Beijing (CN); Jifeng Li, Shanghai (CN); Shulan Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 302 days.

(21) Appl. No.: 17/573,077

(22) Filed: Jan. 11, 2022

(65) Prior Publication Data

US 2022/0132612 A1 Apr. 28, 2022

Related U.S. Application Data

(63) Continuation of application No. PCT/CN2020/099910, filed on Jul. 2, 2020.

(30) Foreign Application Priority Data

Jul. 12, 2019 (CN) .......................... 201910631829.4

(51) Int. Cl.
*H04W 76/16* (2018.01)
*H04W 60/04* (2009.01)
*H04W 76/30* (2018.01)

(52) U.S. Cl.
CPC ........... *H04W 76/16* (2018.02); *H04W 60/04* (2013.01); *H04W 76/30* (2018.02)

(58) Field of Classification Search
CPC ...... H04W 76/15; H04W 76/30; H04W 60/04
See application file for complete search history.

(56) References Cited

U.S. PATENT DOCUMENTS

| 2009/0279489 | A1* | 11/2009 | Deu-Ngoc | H04W 72/56 370/329 |
| 2015/0230070 | A1* | 8/2015 | Kadiyala | H04W 72/02 455/552.1 |
| 2015/0334761 | A1* | 11/2015 | Liao | H04W 76/15 455/552.1 |

FOREIGN PATENT DOCUMENTS

CN  104349312 A  2/2015
CN  104349466 A  2/2015
(Continued)

OTHER PUBLICATIONS

China Telecom, Intel, Use case: Handling of service prioritization, 3GPP TSG-SA WG1 Meeting #86 , S1-191147, Suzhou, China, May 6-10, 2019, 2 pages.

(Continued)

*Primary Examiner* — Duc C Ho
(74) *Attorney, Agent, or Firm* — HAUPTMAN HAM, LLP

(57) ABSTRACT

A communication method includes establishing, by a communication device, a first connection to a first network device and a second connection to a second network device. The first connection and the second connection are used to process a first service. The method also includes sending, by the communication device, first information to the first network device based on the communication device determining that a second service needs to be processed. The second service is different from the first service. The first information is used to request to disable the first connection or the second connection, or the first information is used to indicate the communication device to establish a third connection to a third network device. The third connection is used to process the second service.

20 Claims, 9 Drawing Sheets

(56) References Cited

FOREIGN PATENT DOCUMENTS

| CN | 104769986 A | 7/2015 |
|---|---|---|
| CN | 104811982 A | 7/2015 |
| CN | 104918329 A | 9/2015 |
| CN | 105611588 A | 5/2016 |
| CN | 107079512 A | 8/2017 |
| CN | 108605285 A | 9/2018 |
| CN | 111277998 A | 6/2020 |
| CN | 111294986 A | 6/2020 |
| EP | 2946596 B1 | 3/2017 |
| KR | 20180136862 A | 12/2018 |
| WO | 2010127232 A1 | 11/2010 |
| WO | 2015148711 A1 | 10/2015 |
| WO | 2019057269 A1 | 3/2019 |

OTHER PUBLICATIONS

Ericsson, Handling of cell Activation/Deactivation in Dual connectivity, 3GPP TSG-RAN WG2 #85bis, Tdoc R2-141161, Valencia, Spain, Mar. 31-Apr. 4, 2014, 3 pages.

Vivo, Observations on RAN impacts for RAN related objectives in SID multi-SIM , SA WG2 Meeting #133, S2-1905784, May 13-17, 2019, Reno, NV, USA, 4 pages.

International Search Report issued in corresponding International Application No. PCT/CN2020/099910, dated Sep. 23, 2020, pp. 1-64.

Chinese Office Action issued in corresponding Chinese Application No. 201910631829.4, dated Jun. 3, 2021, pp. 1-17.

Chinese Office Action issued in corresponding Chinese Application No. 201910631829.4, dated Dec. 16, 2021, pp. 1-9.

Vivo (Moderator) et al.,"Report of phase 1 Multi-SIM email discussion", 3GPP TSG-RAN WG Meeting #85, Newport Beach, USA, Sep. 16-20, 2019, RP-191898, total:36 pages.

3rd Generation Partnership Project; Technical Specification Group Services and System Aspects; Study on Support for Multi-USIM Devices (Release 17), 3GPP TR 22.834 V17.0.0(Jun. 2019), total: 18 pages.

Extended European Search Report issued in corresponding European Application No. 20840414.5, dated Jul. 19, 2022, pp. 1-14.

China Telecom et al.,"Motivation for SI on multi-SIM devices in RAN",3GPP TSG RAN Meeting #83 Shenzhen, China, Mar. 18-21, 2019, RP-190248,total:3pages.

European Office Action issued in corresponding European Application No. 20840414.5, dated Aug. 20, 2024, pp. 1-10.

\* cited by examiner

COMMUNICATION METHOD AND APPARATUS

CROSS-REFERENCE TO RELATED APPLICATIONS

This application is a continuation of International Application No. PCT/CN2020/099910, filed on Jul. 2, 2020, which claims priority to Chinese Patent Application No. 201910631829.4, filed on Jul. 12, 2019. The disclosures of the aforementioned applications are hereby incorporated by reference in their entireties.

TECHNICAL FIELD

This application relates to the field of communication technologies, and in particular, to a communication method and apparatus.

BACKGROUND

With development of communication technologies, many terminal devices (for example, mobile phones) all have a dual-SIM dual-standby function. Dual-SIM dual-standby means that two subscriber identity module (subscriber identity module, SIM) cards are simultaneously installed in one mobile phone, and the two SIM cards may be linked-standby simultaneously.

Dual SIM dual standby (dual SIM dual standby, DSDS) is a common solution. One set of transceiver radio frequencies is configured in a DSDS mobile phone. When the mobile phone is in standby mode, two SIM cards may monitor paging at different time. However, because only one set of transceiver radio frequencies is configured in the DSDS mobile phone, the DSDS mobile phone can implement only dual-SIM dual-standby, and the two cards cannot perform communication simultaneously. For example, when one SIM card uses the transceiver radio frequencies to perform voice data transmission, because the SIM card occupies a radio frequency resource completely, the other SIM card cannot receive a paging request due to a lack of an available radio frequency resource, and a failure of answering a call is caused.

To implement dual SIM dual active of the mobile phone, a dual SIM dual active (dual SIM dual active, DSDA) technology is applied to the mobile phone. Two sets of transceiver radio frequencies are configured in the DSDA mobile phone. In other words, either SIM has one set of independent transceiver radio frequencies. In this way, even if one SIM card uses one set of transceiver radio frequencies to perform voice data transmission, the other SIM card may use the other set of transceiver radio frequencies to receive a paging message and answer a call. However, due to emergence of a dual connectivity technology, when the terminal device supports the dual connectivity technology, how to communicate with a network device still needs to be further studied.

SUMMARY

In view of this, this application provides a communication method and apparatus, to implement effective communication between a terminal device that supports a dual connectivity technology and dual receive and dual transmit and a network device.

According to a first aspect, an embodiment of this application provides a communication method, and the method includes: establishing, by a communication device, a first connection to a first network device and a second connection to a second network device, where the first connection and the second connection are used to process a first service; and sending, by the communication device, first information to the first network device if the communication device determines that a second service needs to be processed, where the second service is different from the first service, where the first information is used to request to disable the first connection or the second connection, or the first information is used to indicate the communication device to communicate with a third network device or establish a third connection to the third network device, where the third connection is used to process the second service.

The communication device in this embodiment of this application may be a terminal device. According to the foregoing method, when the terminal device processes the first service, if the terminal device determines that the second service needs to be processed, the terminal device sends the first information to the first network device. In this way, the first network device can process the first connection and the second connection based on the first information, so that the terminal device communicates with the third network device or establishes the third connection to the third network device to process the second service.

In a possible design, disabling may include deactivating, suspending, or releasing. For example, disabling the first connection may include deactivating, suspending, or releasing the first connection.

In a possible design, the first network device and the second network device are network devices in a first network, and the third network device is a network device in a second network; and that the second service is different from the first service includes: the first service is a service of the first network, and the second service is a service of the second network.

In a possible design, the communication device includes a first communication card and a second communication card, the first communication card registers with the first network, and the second communication card registers with the second network; and that the second service is different from the first service further includes: the first service is a service corresponding to the first communication card, and the second service is a service corresponding to the second communication card.

In a possible design, the first information includes at least one of the following:
secondary cell group SCG failure indication information or master cell group MCG failure indication information;
information about a carrier that needs to be used by the communication device to communicate with the third network device or establish the connection to the third network device;
information about a transmitter chain that needs to be used by the communication device to communicate with the third network device or establish the connection to the third network device;
information about a transmitter chain on which parallel transmission is to be performed or parallel transmission is performed and that is in a plurality of transmitter chains of the communication device;
first indication information, where the first indication information is used to indicate that the communication device needs to process the first service and the second service in parallel;

second indication information, where the second indication information is used to indicate that the communication device needs to process a service of the first network device and a service of the third network device in parallel;

third indication information, where the third indication information is used to indicate that the communication device needs to process a service of the second network device and the service of the third network device in parallel;

fourth indication information, where the fourth indication information is used to indicate that the communication device needs to process the service of the first network device, the service of the second network device, and the service of the third network device in parallel;

fifth indication information, where the fifth indication information is used to indicate that the communication device needs to process the first service and the second service in parallel on one of the plurality of transmitter chains of the communication device;

sixth indication information, where the sixth indication information is used to indicate that the communication device needs to process the service of the first network device and the service of the third network device in parallel on one of the plurality of transmitter chains of the communication device;

seventh indication information, where the seventh indication information is used to indicate that the communication device needs to process the service of the second network device and the service of the third network device in parallel on one of the plurality of transmitter chains of the communication device;

eighth indication information, where the eighth indication information is used to indicate that the communication device needs to process the service of the first network device, the service of the second network device, and the service of the third network device in parallel on one of the plurality of transmitter chains of the communication device;

ninth indication information, where the ninth indication information is used to indicate that the communication device needs to process the first service on a first transmitter chain in the plurality of transmitter chains of the communication device, and process the second service on a second transmitter chain in the plurality of transmitter chains; the ninth indication information is used to indicate that the communication device needs to process the service of the first network device and/or the service of the second network device on the first transmitter chain, and process the service of the third network device on the second transmitter chain in the plurality of transmitter chains; the ninth indication information is used to indicate that the communication device needs to process the service of the first network device and/or the service of the third network device on the first transmitter chain, and process the service of the second network device on the second transmitter chain in the plurality of transmitter chains; or the ninth indication information is used to indicate that the communication device needs to process the service of the second network device and/or the service of the third network device on the first transmitter chain, and process the service of the first network device on the second transmitter chain in the plurality of transmitter chains; and tenth indication information, where the tenth indication information is used to indicate that one of the plurality of transmitter chains of the communication device needs to be occupied to perform communication with the third network device.

In a possible design, the method further includes: sending, by the communication device, information about the plurality of transmitter chains of the communication device to the first network device, so that the first network device may obtain the information about the plurality of transmitter chains of the communication device, and the first network device performs corresponding processing based on the information about the plurality of transmitter chains.

In a possible design, information about the transmitter chain includes a number of the transmitter chain or information about a carrier supported by the transmitter chain.

In a possible design, the information about the carrier supported by the transmitter chain includes at least one of the following: frequency information of the carrier supported by the transmitter chain, frequency band information of the carrier supported by the transmitter chain, and a number of the carrier supported by the transmitter chain.

In a possible design, the method further includes: receiving, by the communication device, second information sent by the first network device, where the second information is used to indicate to disable the connection to the second network device (namely, the second connection); disabling, by the communication device, the second connection based on the second information; and communicating with the third network device or establishing the third connection to the third network device by using a transmitter chain corresponding to the second connection.

In a possible design, that the first connection and the second connection are used to process a first service includes: the first connection and the second connection are used to process the first service in dual connectivity mode; and the method further includes: sending, by the communication device, third information to the first network device if the communication device determines that the second service ends or the service of the third network device ends, where the third information is used to request to recover the dual connectivity mode. That the third information is used to request to recover the dual connectivity mode may be understood as that the third information is used to request to activate the dual connectivity mode, activate an SCG, or recover the SCG.

In a possible design, the method further includes: receiving, by the communication device, fourth information sent by the first network device, where the fourth information is used to indicate to recover the dual connectivity mode; and recovering, by the communication device, the dual connectivity mode based on the fourth information.

In this manner, the first network device can activate or recover the dual connectivity mode or transmission of the SCG in time, to improve resource utilization and ensure effective processing of the first service.

In a possible design, that the first information is used to request to disable the first connection or the second connection includes: the first information is used to request to deactivate, suspend, or release the dual connectivity mode or the SCG.

According to a second aspect, an embodiment of this application provides a communication method, and the method includes:

establishing, by a first network device, a first connection to a communication device, where the first connection and a second connection are used to process a first service, and the second connection is a connection between a second network device and the communication device; and receiving, by the first network device, first information sent by the communication device, where the first information is used to request to disable the first connection or the second connection, or the first information is used to indicate the communication device to establish a third connection to a third network device, where the third connection is used to process a second service, and the second service is different from the first service.

In a possible design, the first network device and the second network device are network devices in a first network, and the third network device is a network device in a second network; and that the second service is different from the first service includes: the first service is a service of the first network, and the second service is a service of the second network.

In a possible design, the communication device includes a first communication card and a second communication card, the first communication card registers with the first network, and the second communication card registers with the second network; and that the second service is different from the first service further includes: the first service is a service corresponding to the first communication card, and the second service is a service corresponding to the second communication card.

In a possible design, the first information includes at least one of the following:
  secondary cell group SCG failure indication information or master cell group MCG failure indication information;
  information about a carrier that needs to be used by the communication device to communicate with the third network device or establish the connection to the third network device;
  information about a transmitter chain that needs to be used by the communication device to communicate with the third network device or establish the connection to the third network device;
  information about a transmitter chain on which parallel transmission is to be performed or parallel transmission is performed and that is in a plurality of transmitter chains of the communication device;
  first indication information, where the first indication information is used to indicate that the communication device needs to process the first service and the second service in parallel;
  second indication information, where the second indication information is used to indicate that the communication device needs to process a service of the first network device and a service of the third network device in parallel;
  third indication information, where the third indication information is used to indicate that the communication device needs to process a service of the second network device and the service of the third network device in parallel;
  fourth indication information, where the fourth indication information is used to indicate that the communication device needs to process the service of the first network device, the service of the second network device, and the service of the third network device in parallel;
  fifth indication information, where the fifth indication information is used to indicate that the communication device needs to process the first service and the second service in parallel on one of the plurality of transmitter chains of the communication device;
  sixth indication information, where the sixth indication information is used to indicate that the communication device needs to process the service of the first network device and the service of the third network device in parallel on one of the plurality of transmitter chains of the communication device;
  seventh indication information, where the seventh indication information is used to indicate that the communication device needs to process the service of the second network device and the service of the third network device in parallel on one of the plurality of transmitter chains of the communication device;
  eighth indication information, where the eighth indication information is used to indicate that the communication device needs to process the service of the first network device, the service of the second network device, and the service of the third network device in parallel on one of the plurality of transmitter chains of the communication device;
  ninth indication information, where the ninth indication information is used to indicate that the communication device needs to process the first service on a first transmitter chain in the plurality of transmitter chains of the communication device, and process the second service on a second transmitter chain in the plurality of transmitter chains; the ninth indication information is used to indicate that the communication device needs to process the service of the first network device and/or the service of the second network device on the first transmitter chain, and process the service of the third network device on the second transmitter chain in the plurality of transmitter chains; the ninth indication information is used to indicate that the communication device needs to process the service of the first network device and/or the service of the third network device on the first transmitter chain, and process the service of the second network device on the second transmitter chain in the plurality of transmitter chains; or the ninth indication information is used to indicate that the communication device needs to process the service of the second network device and/or the service of the third network device on the first transmitter chain, and process the service of the first network device on the second transmitter chain in the plurality of transmitter chains; and
  tenth indication information, where the tenth indication information is used to indicate that one of the plurality of transmitter chains of the communication device needs to be occupied to perform communication with the third network device.

In a possible design, the method further includes: receiving, by the first network device, information that is about the plurality of transmitter chains of the communication device and that is sent by the communication device, so that the first network device may obtain the information about the plurality of transmitter chains of the communication device, and the first network device performs corresponding processing based on the information about the plurality of transmitter chains.

In a possible design, information about the transmitter chain includes a number of the transmitter chain or information about a carrier supported by the transmitter chain.

In a possible design, the information about the carrier supported by the transmitter chain includes at least one of the following: frequency information of the carrier supported by the transmitter chain, frequency band information of the carrier supported by the transmitter chain, and a number of the carrier supported by the transmitter chain.

In a possible design, the method further includes: sending, by the first network device, second information to the communication device, where the second information is used to indicate to deactivate, suspend, or release the second connection.

In a possible design, the method further includes: receiving, by the first network device, third information sent by the communication device, where the third information is used to request to activate a dual connectivity mode or recover the dual connectivity mode, or request to activate an SCG and recover the SCG.

In a possible design, the method further includes: sending, by the first network device, fourth information to the communication device, where the fourth information is used to indicate to activate the dual connectivity mode or recover the dual connectivity mode, or activate the SCG and recover the SCG.

According to a third aspect, an embodiment of this application provides a communication method, and the method includes: generating, by a communication device, first indication information, where the communication device is not in dual connectivity mode; and sending, by the communication device, the first indication information to a network device, where the first indication information is used to indicate to deactivate or suspend the dual connectivity mode.

According to the foregoing method, the communication device sends the first indication information to the network device, to effectively avoid that the network device still requests to enter dual connectivity or requests to establish an SCG when the communication device is not suitable for entering the dual connectivity or requesting to establish the SCG.

In a possible design, deactivating or suspending the dual connectivity mode may be understood as deactivating or suspending an SCG.

In a possible design, the sending, by the communication device, the first indication information to a network device includes: sending, by the communication device, the first indication information to the network device if the communication device determines to enter a first transmission mode, where the first transmission mode includes that the communication device processes a service of a first network on a first transmitter chain of the communication device, and processes a service of a second network on a second transmitter chain of the communication device, where the network device is a network device in the first network or a network device in the second network; or the first transmission mode includes that the communication device processes a service of a first network device on a first transmitter chain of the communication device, and processes a service of a second network device on a second transmitter chain of the communication device, where the network device is the first network device or the second network device, the first network device is a network device in a first network, and the second network device is a network device in a second network.

According to the foregoing method, the communication device sends the first indication information to the network device if the communication device determines to enter the first transmission mode, to effectively avoid that the network device still requests to enter the dual connectivity or requests to establish the SCG after the communication device enters the first transmission mode.

In a possible design, the method includes: sending, by the communication device, second indication information to the network device, where the second indication information is used to indicate to activate the dual connectivity mode or recover the dual connectivity mode.

In a possible design, the sending, by the communication device, second indication information to the network device includes: sending, by the communication device, the second indication information to the network device if the communication device determines to exit the first transmission mode.

According to a fourth aspect, an embodiment of this application provides a communication method, and the method includes: receiving, by a communication device, a first request sent by a network device, where the first request is used to request to enter a dual connectivity mode or request to establish an SCG, and the network device is a network device in a first network or a network device in a second network; and sending, by the communication device, a first response to the network device, where the first response is used to reject the first request.

In a possible design, the sending, by the communication device, a first response to the network device includes: sending, by the communication device, the first response to the network device if the communication device determines to enter a first transmission mode, where the first transmission mode includes that the communication device is in transmitter chain capability limited mode in the first network or the second network.

According to the foregoing method, if the communication device determines to enter the first transmission mode, the communication device may reject the first request if the communication device receives the first request sent by the network device, to ensure that the first transmission mode of the communication device is not affected.

In a possible design, that the communication device is in transmitter chain capability limited mode in the first network or the second network includes that the communication device processes a service of the first network on a first transmitter chain of the communication device, and processes a service of the second network on a second transmitter chain of the communication device, or that the communication device processes a service of a first network device on a first transmitter chain of the communication device, and processes a service of a second network device on a second transmitter chain of the communication device.

In a possible design, the first response includes at least one of the following:

first indication information, where the first indication information is used to indicate the communication device to enter the first transmission mode or indicate that the communication device has entered the first transmission mode;

second indication information, where the second indication information is used to indicate that a plurality of transmitter chains of the communication device are all occupied;

third indication information, where the third indication information is used to indicate that the first transmitter chain of the communication device is occupied to perform communication with a network device in the second network;

information about a transmitter chain used by the communication device to communicate with a network device in the first network;

information about a transmitter chain used by the communication device to communicate with the network device in the second network; and information about a transmitter chain used by the communication device to perform parallel transmission with the network device in the first network and the network device in the second network.

In a possible design, the method further includes: sending, by the communication device, information about the plurality of transmitter chains of the communication device to the network device.

In a possible design, information about the transmitter chain includes a number of the transmitter chain or information about a carrier supported by the transmitter chain.

In a possible design, the information about the carrier supported by the transmitter chain includes at least one of the following: frequency information of the carrier supported by the transmitter chain, frequency band information of the carrier supported by the transmitter chain, and a number of the carrier supported by the transmitter chain.

According to a fifth aspect, an embodiment of this application provides an apparatus. The apparatus may be a communication device (for example, a terminal device), or may be a chip disposed in the terminal device. The apparatus has a function of implementing various possible designs of the first aspect, the third aspect, or the fourth aspect. The function may be implemented by hardware, or may be implemented by hardware executing corresponding software. The hardware or software includes one or more units or modules corresponding to the foregoing function.

According to a sixth aspect, an embodiment of this application provides an apparatus. The apparatus may be a network device, or may be a semiconductor chip disposed in the network device. The apparatus has a function of implementing various possible designs of the second aspect. The function may be implemented by hardware, or may be implemented by hardware executing corresponding software. The hardware or software includes one or more units or modules corresponding to the foregoing function.

According to a seventh aspect, an embodiment of this application provides an apparatus, including a processor and a memory. The processor is configured to execute instructions stored in the memory. When the instructions are executed, the apparatus is enabled to perform the methods in various possible designs of the first aspect, the third aspect, or the fourth aspect.

According to an eighth aspect, an embodiment of this application provides a communication system. The communication system includes the terminal device and/or the network device.

According to a ninth aspect, an embodiment of this application further provides a computer-readable storage medium, including instructions. When the instructions are executed, the method in any one of the foregoing aspects or the possible designs of the foregoing aspects is implemented.

According to a tenth aspect, an embodiment of this application further provides a computer program product, including a computer program or instructions. When the computer program or the instructions are executed, the method in any one of the foregoing aspects or the possible designs of the foregoing aspects is implemented.

DESCRIPTION OF EMBODIMENTS

Figure 1A:
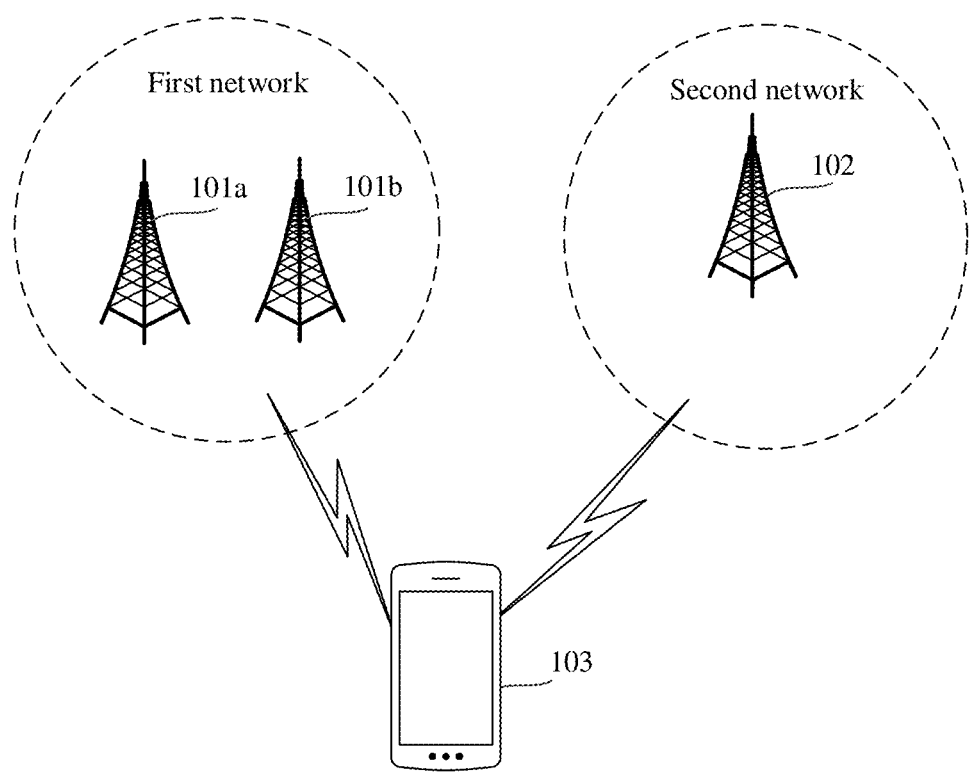
FIG. 1a is a schematic diagram of a communication system to which a communication method according to an embodiment of this application is applicable.

The following clearly describes the technical solutions in embodiments of this application with reference to the accompanying drawings in the embodiments of this application.

Some terms in the embodiments of this application are first described, to help a person skilled in the art have a better understanding.

(1) A terminal device is a device having a wireless transceiver function. The terminal device may be deployed on land, including indoor or outdoor, or may be hand-held, wearable, or vehicle-mounted; may be deployed on water (for example, on a ship); or may be deployed in air (for example, on an airplane, a balloon, and a satellite). The terminal device may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. The terminal device may also be sometimes referred to as user equipment (user equipment, UE), a mobile station, a remote station, or the like. A specific technology, a device form, and a name that are used by the terminal device are not limited in the embodiments of this application.

(2) A network device is an access device used by the terminal device to access a mobile communication system in a wireless manner, and may be a base station, an evolved NodeB (evolved NodeB, eNodeB), a transmission reception point (transmission reception point, TRP), a next generation NodeB (next generation NodeB, gNB) in a 5G mobile communication system, a base station in a future mobile communication system, an access node in a wireless-fidelity (wireless-fidelity, Wi-Fi) system, or the like; or may be a module or a unit that completes some functions of the base station, for example, may be a central unit (central unit, CU), or may be a distributed unit (distributed unit, DU). A specific technology and a specific device form that are used by the network device are not limited in the embodiments of this application.

(3) Dual Connectivity (Dual Connectivity, DC)

In an LTE system, a terminal device supports simultaneous access to two network devices. Such an access mode is referred to as DC. One of the network devices is a master network device, and the other network device is a secondary network device. The master network device may also be referred to as a master node (master node, MN), and the secondary network device may also be referred to as a secondary node (secondary node, SN).

In a development and evolution process of a wireless communication system, an operator deploys both a 5G NR system and the LTE system, and the terminal device also supports simultaneous access to an LTE network device and an NR network device. Because LTE is also referred to as evolved universal terrestrial radio access (evolved universal terrestrial radio access, E-UTRA), such an access mode is referred to as evolved universal terrestrial radio access and new radio dual connectivity (E-UTRA-NR dual connectivity, EN-DC). In EN-DC mode, the LTE network device is a master network device, and the NR network device is a secondary network device. Certainly, with evolution of the system, new air-evolved universal terrestrial radio access dual connectivity (NR-E-UTRA dual connectivity, NE-DC) may also be supported in the future, that is, the NR network device is a master network device, the LTE network device is a secondary network device.

Dual connectivity (dual connectivity, DC) includes a master cell group (master cell group, MCG) and a secondary cell group (secondary cell group, SCG). The MCG may include one or more carriers. If the MCG includes a plurality of carriers, carrier aggregation (carrier aggregation, CA) may be performed among the carriers. The SCG may include one or more carriers. If the SCG includes a plurality of carriers, CA may be performed among the carriers. The master network device is responsible for MCG scheduling, and the secondary network device is responsible for SCG scheduling.

(4) Terms "system" and "network" in the embodiments of this application may be used interchangeably. "At least one" means one or more, and "a plurality of" means two or more. "And/or" describes an association relationship between associated objects and represents that three relationships may exist. For example, A and/or B may represent the following three cases: Only A exists, both A and B exist, and only B exists. A and B may be in a singular or plural form. The character "I" usually indicates an "or" relationship between the associated objects. "At least one of the following" or a similar expression thereof indicates any combination of these items, including a single item or any combination of a plurality of items. For example, at least one of a, b, or c may indicate a, b, c, a and b, a and c, b and c, or a, b, and c, where a, b, and c each may be singular or plural.

In addition, unless otherwise specified, ordinal numbers such as "first" and "second" in the embodiments of this application are used to distinguish between a plurality of objects, but are not intended to limit a sequence, a time sequence, priorities, or importance of the plurality of objects. For example, first indication information and second indication information are merely intended to distinguish between different indication information, but do not indicate that the two types of indication information are different in content, priorities, sending sequences, importance, or the like.

The embodiments of this application may be applied to various communication systems, for example, a long term evolution (long term evolution, LTE) system, a long term evolution-advanced (long term evolution-advanced, LTE-A) system, a fifth generation (fifth generation, 5G) mobile communication technology new radio (new radio, NR) system, and a possible future communication system, which are not specifically limited.

For ease of understanding the embodiments of this application, a communication system shown in FIG. 1a is first used as an example to describe in detail a communication system to which the embodiments of this application are applicable. FIG. 1a is a schematic diagram of a communication system to which a communication method according to an embodiment of this application is applicable. As shown in FIG. 1a, the communication system includes a network device 101a, a network device 101b, a network device 102, and a terminal device. For example, the network device 101a and the network device 101b may be network devices in a first network, and the network device 102 may be a network device in a second network. The terminal device 103 may be a terminal device supporting a single subscriber, or may be a terminal device supporting a plurality of subscribers (for example, two subscribers). For example, the terminal device 103 is a terminal device supporting two subscribers. The terminal device 103 may have two subscriber identities (for example, a first subscriber identity and a second subscriber identity), and the terminal device 103 may register with the first network by using the first subscriber identity, and register with the second network by using the second subscriber identity. Alternatively, it may be understood as that the terminal device 103 includes two subscribers (for example, a first subscriber and a second subscriber), the first subscriber of the terminal device 103 registers with the first network, and the second subscriber registers with the second network.

It should be noted: (1) In FIG. 1a, only an example in which the terminal device has two subscriber identities and registers with two networks is used. In another possible embodiment, the terminal device may also have more than two subscriber identities and may register with more than two networks. This embodiment of this application is described mainly on the basis that the terminal device has two subscriber identities and registers with two networks. When the terminal device has more than two subscriber identities and registers with more than two networks, for specific implementation, refer to related descriptions in which the terminal device has two subscriber identities and registers with two networks.

(2) In this embodiment of this application, a "subscriber" (for example, the first subscriber or the second subscriber) is a logical concept, and the "subscriber" may correspond to a SIM card, subscriber information, a virtual SIM card, or a subscriber identifier (for example, an international mobile subscriber identity (international mobile subscriber identity, IMSI)/temporary mobile subscriber identity (temporary mobile subscriber identity, TMSI)), and is not limited to a natural person subscriber, a physical terminal (a mobile phone), or the like. From a perspective of a network side, different "subscribers" logically correspond to different communication entities served by the network side. For example, a terminal having a dual registration function is equivalent to two communication entities for the network side. For another example, when the "subscriber" corresponds to the SIM card or the subscriber information, the network side identifies two terminals having different SIM cards or different subscriber information as two different communication entities, or identifies a same terminal device having a plurality of different SIM cards or a plurality of pieces of subscriber information as a plurality of different communication entities, even though actually, the terminal having the plurality of different SIM cards or the plurality of pieces of subscriber information is only one physical entity. This embodiment of this application is described mainly by using an example in which the "subscriber" corresponds to the SIM card.

Figure 1B:
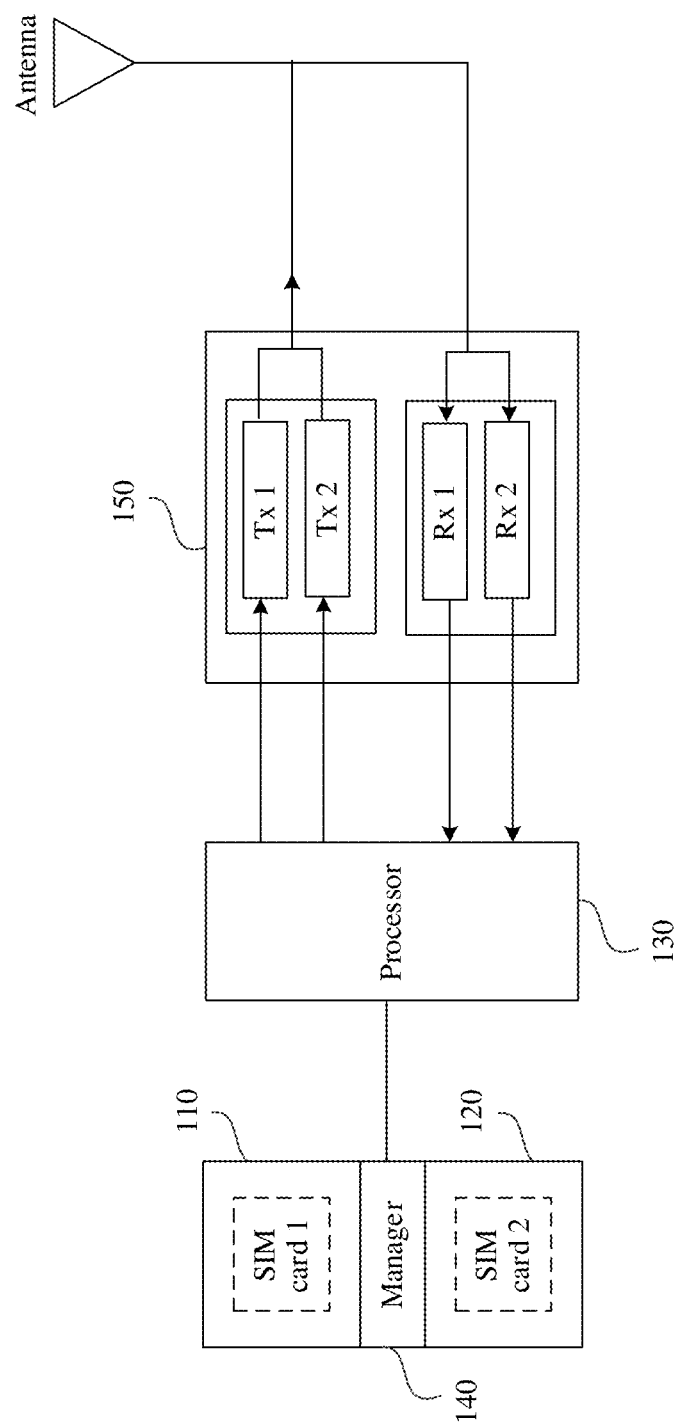
FIG. 1b is a schematic diagram of a structure of a terminal device according to an embodiment of this application.

FIG. 1b is a schematic diagram of a structure of a terminal device according to an embodiment of this application. The terminal device may be the terminal device 103 shown in FIG. 1a. As shown in FIG. 1b, the terminal device 103 may include a first SIM card interface 110, a second SIM card interface 120, a manager 140 separately coupled to the first SIM card interface 110 and the second SIM card interface 120, a processor 130 coupled to the manager 140, and a transceiver 150 connected to the processor 130. The processor 130 may be a baseband processor (baseband processor, BBP). As shown in FIG. 1b, the transceiver 150 includes a radio frequency Rx1 channel, a radio frequency Rx2 channel, a radio frequency Tx1 channel, and a radio frequency Tx2 channel. The first SIM card interface 110 is configured to install a SIM card 1, and the second SIM card interface 120 is configured to install a SIM card 2. The manager 140 may send an uplink data packet related to a service of the SIM card 1 to the processor 130, or send an uplink data packet related to a service of the SIM card 2 to the processor 130. Correspondingly, the processor 130 may send the uplink data packet related to the service of the SIM card 1 on the radio frequency Tx1 channel, or send the uplink data packet related to the service of the SIM card 2 on the radio frequency Tx2 channel.

For example, the terminal device 103 may be a terminal device that can support network standards of a plurality of operators, that is, the terminal device 103 can support networks of a plurality of operators (for example, two or all of China Unicom, China Mobile, and China Telecom). A first SIM card is used as an example. The terminal device 103 can determine, by obtaining identification code of the first SIM card, an operator to which the first SIM card belongs, and further make the first SIM card register with a network of the corresponding operator. After the first SIM card registers with the network of the corresponding operator, the terminal device 103 may access a network device (for example, the network devices 101) in the network of the corresponding operator by using a random access process, and further send the uplink data packet of the service to the network devices 101. A second SIM card is used as an example. The terminal device 103 can determine, by obtaining identification code of the second SIM card, an operator to which the second SIM card belongs, and further make the second SIM card register with a network of the corresponding operator. After the second SIM card registers with the network of the corresponding operator, the terminal device 103 may access a network device (for example, the network device 102) in the network of the corresponding operator by using a random access process, and further send the uplink data packet of the service to the network device 102.

In this embodiment of this application, a radio frequency Tx channel may also be referred to as a Tx radio frequency resource, a transmitter (Transmitter), or a transmitter chain, and a radio frequency Rx channel may also be referred to as an Rx radio frequency resource, a receiver (Receiver), or a receiver chain. This is not specifically limited.

For the terminal device shown in FIG. 1a and FIG. 1b, when the terminal device supports DC, for example, the terminal device 103 may separately access the network device 101a and the network device 101b in the first network after registering with the first network. The network device 101a and the network device 101b jointly serve the terminal device (that is, the terminal device 103 works in the first network in DC mode). In other words, the terminal device may simultaneously communicate with the network device 101a and the network device 101b in the first network. For example, the terminal device may send, to the network device 101a by using the radio frequency Tx1 channel, the uplink data packet related to the service of the SIM card 1, and send, to the network device 101b by using the radio frequency Tx2 channel, the uplink data packet related to the service of the SIM card 1. Because the terminal device has only two radio frequency Tx channels, the two radio frequency Tx channels have been occupied when the terminal device sends the uplink data packet related to the service of the SIM card 1. Consequently, the terminal device cannot send the uplink data packet related to the service of the SIM card 2.

Based on this, communication between a terminal device that supports a dual connectivity technology and a network device is mainly studied in the embodiments of this application.

The following describes in detail communication methods provided in the embodiments of this application.

Embodiment 1

Figure 2:
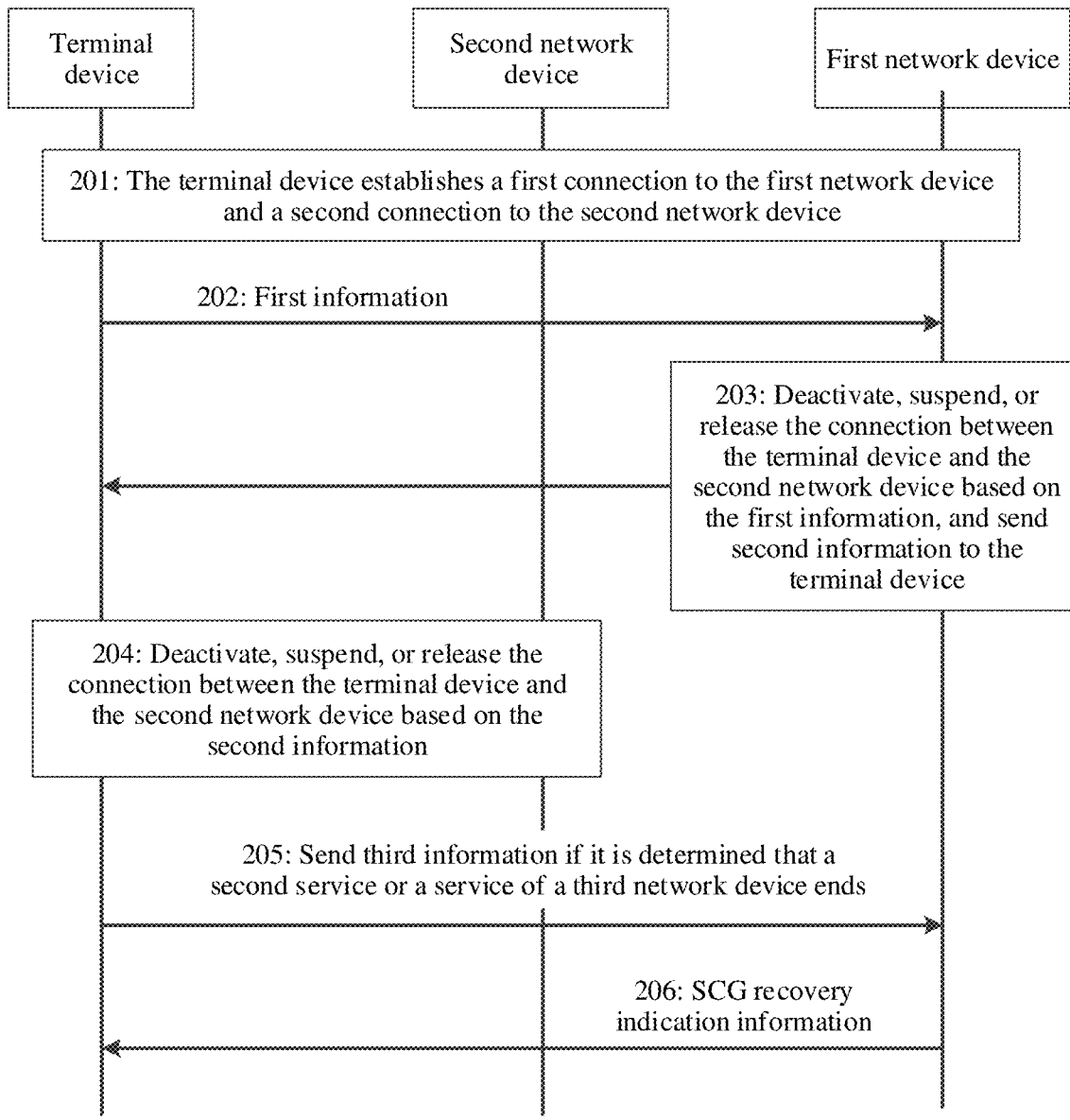
FIG. 2 is a schematic flowchart corresponding to a communication method according to Embodiment 1 of this application.

FIG. 2 is a schematic flowchart corresponding to a communication method according to Embodiment 1 of this application. As shown in FIG. 2, the communication method includes the following steps.

Step 201: A terminal device establishes a first connection to a first network device and a second connection to a second network device, where the first connection and the second connection are used to process a first service.

For example, that the first connection and the second connection are used to process a first service includes: The first connection and the second connection are used to process the first service in dual connectivity mode.

In this embodiment of this application, at least one radio bearer (radio bearer, RB) may be established between the terminal device and a network device (for example, the first network device) to perform data transmission. Radio bearers may be classified into a signaling radio bearer (signaling radio bearer, SRB) used to transmit signaling data and a data radio bearer (data radio bearer, DRB) used to transmit service data. That the first connection and the second connection are used to process the first service in dual connectivity mode may be understood as: Data transmission is performed by using an SRB and/or a DRB between the terminal device and the first network device and an SRB and/or a DRB between the terminal device and the second network device to process the first service, in other words, the first service includes the SRB and/or the DRB between the terminal device and the first network device and the SRB and/or the DRB between the terminal device and the second network device. Further, the first service may include any one or more of an MCG SRB, an MCG DRB, an SCG SRB, an SCG DRB, a split data radio bearer (Split DRB), or a split signaling radio bearer (Split SRB).

It should be noted that, that the first connection and the second connection are used to process a first service neither constitutes a limitation that the first service needs to be processed by using the first connection and the second connection together nor constitutes a limitation that the first service needs to be processed by using the first network device and the second network device together. The first service may be processed only on the first connection. For example, from a perspective of the terminal device, data carried on the MCG SRB or the MCG DRB may be transmitted only on the first connection or only on the second connection, or is transmitted only by using the first network device or only by using the second network device.

For example, the first service may include one service, or may include a plurality of services. For example, from the perspective of the terminal device, the first service may include two specific services, for example, one MCG DRB and one SCG DRB. The MCG DRB is transmitted on the first connection, and the SCG DRB is transmitted on the second connection. Alternatively, the MCG DRB is transmitted by using the first network device, and the SCG DRB is transmitted by using the second network device. For another example, from the perspective of the terminal device, the first service may include one specific service, for example, one split DRB. One part of data of the split DRB is transmitted by using the first connection, and the other part of the data is transmitted by using the second connection. In other words, one part of data of the split DRB is transmitted by using the first network device, and the other part of the data is transmitted by using the second network device.

Step 202: If the terminal device determines that a second service needs to be processed, the terminal device sends first information to the first network device, where the first information is used to request to deactivate (deactivate), suspend, or release the connection to the first network device (namely, the first connection) or the connection to the second network device (namely, the second connection), or the first information is used to indicate the terminal device to communicate with a third network device or establish a third connection to the third network device.

For example, the terminal device may be a terminal device supporting a single communication card (that is, the terminal device has one subscriber identity), or the terminal device may be a terminal device supporting a plurality of communication cards (dual communication cards are used as an example herein) (that is, the terminal device has two subscriber identities). The communication card may be a physical card (for example, a SIM card) or a virtual card (for example, a virtual SIM card). The physical card indicates that the terminal device has two actual SIM cards, and two physical cards respectively correspond to two subscriber identities. Two virtual cards also respectively correspond to two subscriber identities, but there is no actual hardware card.

For example, the first network device and the second network device may be network devices in a first network, and the third network device may be a network device in a second network. The first service may be a service of the first network, and the second service may be a service of the second network. The second network may have a plurality of forms. For example, the second network may be another network of a same operator relative to the first network, for example, either of two core networks of the same operator. For example, one base station of an operator A may access two different core networks (for example, an EPC, to be specific, an evolved packet core, and a 5G core (5GC)). The second network may alternatively be a network of another operator. That is, the first network and the second network belong to two different operators. In addition, in a network sharing scenario, although the first network and the second network may be networks of the different operators, some devices, for example, a network device, may be shared. Therefore, in a scenario in which two operators share the network device, the first network device and the third network device may be a same network device entity, or the second network device and the third network device may be a same network device entity. For example, in the first network and the second network of the same operator, the terminal device may have two subscriber identities, or may have one subscriber identity.

The following uses an example in which the terminal device supports dual SIM cards for description.

For example, the terminal device includes a first SIM card and a second SIM card, and a network of an operator to which the first SIM card belongs may be the same as or different from a network of an operator to which the second SIM card belongs. For example, the network of the operator to which the first SIM card belongs may be different from the network of the operator to which the second SIM card belongs (respectively the first network and the second network). The first SIM card may register with the first network, and the second SIM card may register with the second network. Further, after the first SIM card registers with the first network, the terminal device may access a network device in the first network, for example, access the first network device and the second network device (one of the first network device and the second network device is a master network device, and the other network device is a secondary network device) in the first network, that is, establish dual connections to the first network device and the second network device. For specific implementation of establishing the dual connections, refer to an existing solution. Details are not described herein again. In this case, the terminal device may process a service of the first network in dual connectivity mode.

In this embodiment of this application, deactivating the connection to the first network device or the second network device may include suspending data transmission with the first network device or the second network device, but maintaining the connection to the first network device or the second network device (that is, not releasing configuration information of the first network device or the second network device). Suspending the connection to the first network device or the second network device may include suspending data transmission with the first network device or the second network device, but maintaining the connection to the first network device or the second network device (that is, not releasing the configuration information of the first network device or the second network device). Releasing the connection to the first network device or the second network device may include stopping data transmission with the first network device or the second network device, and releasing the configuration information of the first network device or the second network device. It should be noted that, for a suspended state and a deactivated state, when data transmission needs to be recovered, duration required for recovering data transmission in the suspended state may be different from duration required for recovering data transmission in the deactivated state. For example, the duration required for recovering data transmission in the suspended state may be greater than the duration required for recovering data transmission in the deactivated state.

Step 203: The first network device performs corresponding processing based on the first information. For example, the first network device deactivates, suspends, or releases the connection between the terminal device and the first network device or the second network device based on the first information, or the first network device (or the second network device) and the third network device communicate with the terminal device by performing time division multiplexing on one transmitter chain of the terminal device. For details, refer to the following detailed descriptions.

For example, if in step 203, the first network device deactivates, suspends, or releases the connection between the terminal device and the second network device based on the first information, and sends second information to the terminal device, where the second information is used to indicate to deactivate, suspend, or release the connection between the terminal device and the second network device, correspondingly, in step 204, the terminal device receives the second information sent by the first network device, where the second information is used to indicate to deactivate, suspend, or release the connection to the second network device, and deactivates, suspends, or releases the connection to the second network device based on the second information.

It should be noted: (1) Step 204 is an optional step. In other words, the terminal device may deactivate, suspend, or release the connection to the second network device after receiving the second information sent by the first network device, or the terminal device may deactivate, suspend, or release the connection to the second network device after sending the first information to the first network device. (2) That the first network device deactivates, suspends, or releases the connection between the terminal device and the second network device may be understood as that the first network device sends indication information to the second network device, to indicate the second network device to deactivate, suspend, or release the connection to the terminal device. Correspondingly, the second network device may deactivate, suspend, or release the connection to the terminal device based on the indication information.

The following describes in detail processing that may be performed by the terminal device and a network device (for example, the first network device, the second network device, or the third network device) after the terminal device sends the first information and the first network device receives the first information.

In this embodiment of this application, the terminal device may include two transmitter chains, namely, a transmitter chain 1 and a transmitter chain 2. Information about a carrier supported by the transmitter chain 1 may be the same as or different from information about a carrier supported by the transmitter chain 2. In an example, the transmitter chain 1 is used as an example. The information about the carrier supported by the transmitter chain 1 may include at least one of frequency information of the carrier supported by the transmitter chain 1, frequency band information of the carrier supported by the transmitter chain 1, and a number of the carrier supported by the transmitter chain 1. This is not specifically limited.

For example, the information about the carrier supported by the transmitter chain 1 is a frequency band 1, and the information about the frequency supported by the transmitter chain 2 is a frequency band 2. Further, the frequency band 1 may be a low frequency band, and the frequency band 2 may be a high frequency band. In this case, for ease of clear illustration, it is described below as that the transmitter chain 1 supports a low frequency, and the transmitter chain 2 supports a high frequency. When the transmitter chain 1 supports the low frequency and the transmitter chain 2 supports the high frequency, the terminal device may communicate with a master network device on the transmitter chain 1 supporting the low frequency, and communicate with a secondary network device on the transmitter chain 2 supporting the high frequency. Alternatively, when both the transmitter chain 1 and the transmitter chain 2 support the low frequency, the terminal device may communicate with a master network device on one transmitter chain supporting the low frequency, and communicate with a secondary network device on the other transmitter chain.

For example, the first information may include at least one of the following (1) to (14). (1) SCG failure indication information or MCG failure indication information. In other words, the first information may include the SCG failure indication information or the MCG failure indication information. In this case, that the terminal device sends the first information to the first network device may be understood as that the terminal device triggers SCG failure (failure) reporting or MCG failure reporting. (2) Information about a carrier that needs to be used by the terminal device to communicate with the third network device or establish the connection to the third network device. (3) Information about a transmitter chain that needs to be used by the terminal device to communicate with the third network device or establish the connection to the third network device. (4) Information about a transmitter chain on which parallel transmission is to be performed or parallel transmission is performed and that is in a plurality of transmitter chains of the terminal device. (5) First indication information, where the first indication information is used to indicate that the terminal device needs to process the first service and the second service in parallel. (6) Second indication information, where the second indication information is used to indicate that the terminal needs to process a service of the first network device and a service of the third network device in parallel. (7) Third indication information, where the third indication information is used to indicate that the terminal device needs to process a service of the second network device and the service of the third network device in parallel. (8) Fourth indication information, where the fourth indication information is used to indicate that the terminal device needs to process the service of the first network device, the service of the second network device, and the service of the third network device in parallel. (9) Fifth indication information, where the fifth indication information is used to indicate that the terminal device needs to process the first service and the second service in parallel on one of the plurality of transmitter chains of the terminal device. (10) Sixth indication information, where the sixth indication information is used to indicate that the terminal device needs to process the service of the first network device and the service of the third network device in parallel on one of the plurality of transmitter chains of the terminal device. (11) Seventh indication information, where the seventh indication information is used to indicate that the terminal device needs to process the service of the second network device and the service of the third network device in parallel on one of the plurality of transmitter chains of the terminal device. (12) Eighth indication information, where the eighth indication information is used to indicate that the terminal device needs to process the service of the first network device, the service of the second network device, and the service of the third network device in parallel on one of the plurality of transmitter chains of the terminal device. (13) Ninth indication information, where the ninth indication information is used to indicate that the terminal device needs to process the first service on a first transmitter chain in the plurality of transmitter chains of the terminal device, and process the second service on a second transmitter chain in the plurality of transmitter chains; the ninth indication information is used to indicate that the terminal device needs to process the service of the first network device and/or the service of the second network device on the first transmitter chain, and process the service of the third network device on the second transmitter chain in the plurality of transmitter chains; the ninth indication information is used to indicate that the terminal device needs to process the service of the first network device and/or the service of the third network device on the first transmitter chain, and process the service of the second network device on the second transmitter chain in the plurality of transmitter chains; or the ninth indication information is used to indicate that the terminal device needs to process the service of the second network device and/or the service of the third network device on the first transmitter chain, and process the service of the first network device on the second transmitter chain in the plurality of transmitter chains. (14) Tenth indication information, where the tenth indication information is used to indicate that one of the plurality of transmitter chains of the terminal device needs to be occupied to perform communication with the third network device.

That the first network device is a master network device, and the second network device is a secondary network device; before sending the first information, the terminal device communicates with the first network device by using the transmitter chain 1, and communicates with the second network device by using the transmitter chain 2 is used as an example to describe processing that may be performed by the terminal device and the network device in a plurality of possible cases of the first information.

Case 1

The first information may include (1) above.

In this case, the first network device may directly deactivate, suspend, or release the connection between the terminal device and the second network device based on the first information (for example, the first information includes the SCG failure indication information). Further, the terminal device may process a service of the second network by using the transmitter chain 2. In this manner, the first network device can deactivate, suspend, or release the connection between the terminal device and the second network device based on the first information, so that the terminal device communicates with the third network device or establishes a connection to the third network device to process the second service, to effectively ensure timely processing of the second service.

Case 2

The first information may include (2) above.

In this case, the first network device may obtain the information about the carrier that needs to be used by the terminal device to communicate with the third network device, the information about the carrier supported by the transmitter chain 1, and the information about the carrier supported by the transmitter chain 2, and further perform corresponding processing based on the information about the carrier that needs to be used by the terminal device to communicate with the third network device, the information about the carrier supported by the transmitter chain 1, and the information about the carrier supported by the transmitter chain 2. After receiving the first information, the first network device may obtain, from the first information, the information about the carrier that needs to be used by the terminal device to communicate with the third network device. There may also be a plurality of implementations in which the first network device obtains the information about the carrier supported by the transmitter chain 1 and the information about the carrier supported by the transmitter chain 2. For example, the terminal device may send information about the transmitter chain 1 and information about the transmitter chain 2 to the first network device, where the information about the transmitter chain 1 may include the information about the carrier supported by the transmitter chain 1, and the information about the transmitter chain 2 may include the information about the carrier supported by the transmitter chain 2.

For example, the transmitter chain 1 supports the low frequency, and the transmitter chain 2 supports the high frequency. If a frequency band that needs to be used by the terminal device to communicate with the third network device is a high frequency band (that is, the frequency band that needs to be used by the terminal device to communicate with the third network device conflicts with a frequency band that is used by the terminal device to communicate with the second network device), the first network device may suspend or release the connection between the terminal device and the second network device. Further, the terminal device may process a service of the second network by using the transmitter chain 2; or the second network device and the third network device communicate with the terminal device by performing time division multiplexing on the transmitter chain 2, and the first network device communicates with the terminal device by using the transmitter chain 1.

For another example, the transmitter chain 1 supports the low frequency, and the transmitter chain 2 supports the high frequency. If a frequency band that needs to be used by the terminal device to communicate with the third network device is a low frequency band (that is, the frequency band that needs to be used by the terminal device to communicate with the third network device conflicts with a frequency band that is used by the terminal device to communicate with the first network device), the first network device may suspend or release the connection between the terminal device and the first network device; or the first network device and the second network device adjust used transmitter chains, for example, "the first network device communicates with the terminal device by using the transmitter chain 1, and the second network device communicates with the terminal device by using the transmitter chain 2" is adjusted to "the first network device communicates with the terminal device by using the transmitter chain 2, and the second network device communicates with the terminal device by using the transmitter chain 2", and the first network device may suspend or release the connection between the terminal device and the second network device after the adjustment succeeds. Further, the terminal device may process a service of the second network by using the transmitter chain 1; or the first network device and the third network device communicate with the terminal device by performing time division multiplexing on the transmitter chain 1, in other words, the terminal device communicates with the first network device and the third network device in a time division multiplexing manner on the transmitter chain 1 (in other words, the terminal device processes the service of the first network and the service of the second network in parallel in the time division multiplexing manner on the transmitter chain 1), and communicates with the second network device on the transmitter chain 2. In this embodiment of this application, there may be a plurality of specific implementations in which the first network device and the second network device adjust the used transmitter chains. Specifically, a network side may select, based on an actual requirement, an appropriate manner for implementation. This is not limited in this embodiment of this application.

For another example, the transmitter chain 1 supports the low frequency, and the transmitter chain 2 supports the low frequency. If a frequency band that needs to be used by the terminal device to communicate with the third network device is a low frequency band, the first network device may suspend or release the connection between the terminal device and the first network device. Further, the terminal device may process a service of the second network by using the transmitter chain 1; or the first network device may suspend or release the connection between the terminal device and the second network device. Further, the terminal device may process the service of the second network by using the transmitter chain 2; the first network device and the third network device communicate with the terminal device by performing time division multiplexing on the transmitter chain 1; or the second network device and the third network device communicate with the terminal device by performing time division multiplexing on the transmitter chain 2.

In this manner, the first network device processes dual connectivity of the terminal device based on the information about the carrier that needs to be used by the terminal device to communicate with the third network device. In this way, a corresponding connection can be more appropriately deactivated, suspended, or released, so that the terminal device communicates with the third network device or establishes the connection to the third network device to process the second service.

Case 3

The first information may include (3) above.

In this case, the first network device may obtain information about the transmitter chain (for example, may be number information of the transmitter chain) that needs to be used by the terminal device to communicate with the third network device, number information of the transmitter chain 1, and number information of the transmitter chain 2, and further perform corresponding processing based on the number information of the transmitter chain that needs to be used by the terminal device to communicate with the third network device, the number information of the transmitter chain 1, and the number information of the transmitter chain 2. After receiving the first information, the first network device may obtain, from the first information, the information about the transmitter chain that needs to be used by the terminal device to communicate with the third network device. There may be a plurality of implementations in which the first network device obtains the number information of the transmitter chain 1 and the number information of the transmitter chain 2. For example, the terminal device may send information about the transmitter chain 1 and information about the transmitter chain 2 to the first network device, where the information about the transmitter chain 1 may include the number information of the transmitter chain 1, and the information about the transmitter chain 2 may include the number information of the transmitter chain 2.

For example, if the number information of the transmitter chain that needs to be used by the terminal device to communicate with the third network device is the number information of the transmitter chain 2 (that is, the transmitter chain that needs to be used by the terminal device to communicate with the third network device is the transmitter chain 2), the first network device may suspend or release the connection between the terminal device and the second network device, and further, the terminal device may process a service of the second network by using the transmitter chain 2; or the second network device and the third network device communicate with the terminal device by performing time division multiplexing on the transmitter chain 2.

For another example, if the transmitter chain that needs to be used by the terminal device to communicate with the third network device is the transmitter chain 1, the first network device may suspend or release the connection between the terminal device and the first network device. Further, the terminal device may use the transmitter chain 1 to process a service of the second network; the first network device and the third network device communicate with the terminal device by performing time division multiplexing on the transmitter chain 2; or the first network device and the second network device adjust used transmitter chains, for example, "the first network device communicates with the terminal device by using the transmitter chain 1, and the second network device communicates with the terminal device by using the transmitter chain 2" is adjusted to "the first network device communicates with the terminal device by using the transmitter chain 2, and the second network device communicates with the terminal device by using the transmitter chain 2", the first network device may suspend or release the connection between the terminal device and the second network device after the adjustment succeeds, and further, the terminal device may process the service of the second network by using the transmitter chain 1.

In this manner, the first network device processes dual connectivity of the terminal device based on the information about the transmitter chain that needs to be used by the terminal device to communicate with the third network device. In this way, a corresponding connection can be more appropriately deactivated, suspended, or released, so that the terminal device communicates with the third network device or establishes the connection to the third network device to process the second service.

Case 4

The first information may include (4) above.

In this case, the first network device may obtain the information about the transmitter chain on which parallel transmission is to be performed or parallel transmission is performed and that is in the plurality of transmitter chains of the terminal device, information about the transmitter chain 1, and information about the transmitter chain 2, and perform corresponding processing based on the information about the transmitter chain on which parallel transmission is to be performed or parallel transmission is performed, the information about the transmitter chain 1, and the information about the transmitter chain 2. For example, information about a transmitter chain is number information of the transmitter chain. After receiving the first information, the first network device may obtain, from the first information, number information of the transmitter chain on which parallel transmission is to be performed or parallel transmission is performed. There may be a plurality of implementations in which the first network device obtains number information of the transmitter chain 1 and number information of the transmitter chain 2. This is not specifically limited.

For example, if the transmitter chain on which parallel transmission is to be performed or parallel transmission is performed is the transmitter chain 2, the first network device may communicate with the terminal device on the transmitter chain 1, and the second network device and the third network device communicate with the terminal device by performing time division multiplexing on the transmitter chain 2 (that is, parallel transmission is performed on the transmitter chain 2 in a time division multiplexing manner).

In this manner, the first network device can learn, based on the information about the transmitter chain on which parallel transmission is to be performed or parallel transmission is performed and that is in the plurality of transmitter chains of the terminal device, of a transmitter chain on which parallel transmission needs to be performed, and further process dual connectivity of the terminal device in a targeted manner.

Case 5

The first information may include (5) above.

In this case, the first network device may perform corresponding processing based on the first indication information.

For example, after receiving the first information (including the first indication information), the first network device may deactivate, suspend, or release the connection between the terminal device and the second network device. Further, the terminal device may process a service of the second network by using the transmitter chain 2; the second network device and the third network device communicate with the terminal device by performing time division multiplexing on the transmitter chain 2, and the first network device communicates with the terminal device by using the transmitter chain 1; or the first network device and the third network device communicate with the terminal device by performing time division multiplexing on the transmitter chain 1, and the second network device communicates with the terminal device by using the transmitter chain 2.

Case 6

The first information may include (6) above.

In this case, the first network device may perform corresponding processing based on the second indication information.

For example, after receiving the first information (including the second indication information), the first network device may deactivate, suspend, or release the connection between the terminal device and the second network device. Further, the terminal device may process a service of the second network by using the transmitter chain 2; the second network device and the third network device communicate with the terminal device by performing time division multiplexing on the transmitter chain 2, and the first network device communicates with the terminal device by using the transmitter chain 1; or the first network device and the third network device communicate with the terminal device by performing time division multiplexing on the transmitter chain 1, and the second network device communicates with the terminal device by using the transmitter chain 2.

Case 7

The first information may include (7) above.

In this case, the first network device may perform corresponding processing based on the third indication information.

For example, after the first network device receives the first information (including the third indication information), the first network device may communicate with the terminal device by using the transmitter chain 1, and the second network device and the third network device communicate with the terminal device by performing time division multiplexing on the transmitter chain 2; or the first network device and the third network device communicate with the terminal device by performing time division multiplexing on the transmitter chain 1, and the second network device communicates with the terminal device by using the transmitter chain 2.

Case 8

The first information may include (8) above.

In this case, the first network device may perform corresponding processing based on the fourth indication information.

For example, after the first network device receives the first information (including the fourth indication information), the first network device may communicate with the terminal device by using the transmitter chain 1, and the second network device and the third network device communicate with the terminal device by performing time division multiplexing on the transmitter chain 2; or the first network device and the third network device communicate with the terminal device by performing time division multiplexing on the transmitter chain 1, and the second network device communicates with the terminal device by using the transmitter chain 2.

In the foregoing manner, after determining, based on the fourth indication information, that the service of the first network device, the service of the second network device, and the service of the third network device need to be processed in parallel, the first network device may not deactivate, suspend, or release the connection between the terminal device and the first network device or the connection between the terminal device and the second network device.

Case 9

The first information may include (9) above.

In this case, the first network device may perform corresponding processing based on the fifth indication information.

For example, after the first network device receives the first information (including the fifth indication information), the first network device may communicate with the terminal device by using the transmitter chain 1, and the second network device and the third network device communicate with the terminal device by performing time division multiplexing on the transmitter chain 2 (that is, the service of the first network and a service of the second network are processed in parallel on the transmitter chain 2); or the first network device and the third network device communicate with the terminal device by performing time division multiplexing on the transmitter chain 1, and the second network device communicates with the terminal device by using the transmitter chain 2 (that is, the service of the first network and the service of the second network are processed in parallel on the transmitter chain 1).

In the foregoing manner, after determining, based on the fifth indication information, that the first service and the second service need to be processed in parallel on one of the plurality of transmitter chains, the first network device may not deactivate, suspend, or release the connection between the terminal device and the first network device or the connection between the terminal device and the second network device.

Case 10

The first information may include (10) above.

In this case, the first network device may perform corresponding processing based on the sixth indication information.

For example, after the first network device receives the first information (including the sixth indication information), the first network device and the third network device may communicate with the terminal device by performing time division multiplexing on the transmitter chain 1, and the second network device communicates with the terminal device by using the transmitter chain 2 (that is, the service of the first network device and the service of the third network device are processed in parallel on the transmitter chain 1). Alternatively, the first network device and the second network device adjust used transmitter chains, for example, "the first network device communicates with the terminal device by using the transmitter chain 1, and the second network device communicates with the terminal device by using the transmitter chain 2" is adjusted to "the first network device communicates with the terminal device by using the transmitter chain 2, and the second network device communicates with the terminal device by using the transmitter chain 2", and after the adjustment succeeds, the first network device and the third network device communicate with the terminal device by performing time division multiplexing on the transmitter chain 2, and the second network device communicates with the terminal device by using the transmitter chain 1 (that is, the service of the first network device and the service of the third network device are processed in parallel on the transmitter chain 2).

Case 11

The first information may include (11) above.

In this case, the first network device may perform corresponding processing based on the seventh indication information.

For example, after the first network device receives the first information (including the seventh indication information), the first network device may communicate with the terminal device on the transmitter chain 1, and the second network device and the third network device communicate with the terminal device by performing time division multiplexing on the transmitter chain 2 (that is, the service of the second network device and the service of the third network device are processed in parallel on the transmitter chain 2). Alternatively, the first network device and the second network device adjust used transmitter chains, for example, "the first network device communicates with the terminal device by using the transmitter chain 1, and the second network device communicates with the terminal device by using the transmitter chain 2" is adjusted to "the first network device communicates with the terminal device by using the transmitter chain 2, and the second network device communicates with the terminal device by using the transmitter chain 2", and after the adjustment succeeds, the second network device and the third network device communicate with the terminal device by performing time division multiplexing on the transmitter chain 1, and the first network device communicates with the terminal device by using the transmitter chain 2 (that is, the service of the second network device and the service of the third network device are processed in parallel on the transmitter chain 1).

Case 12

The first information may include (12) above.

In this case, the first network device may perform corresponding processing based on the eighth indication information.

For example, after the first network device receives the first information (including the eighth indication information), the first network device, the second network device, and the third network device may communicate with the terminal device by performing time division multiplexing on the transmitter chain 1 (that is, the service of the first network device, the service of the second network device, and the service of the third network device are processed in parallel on the transmitter chain 1). Alternatively, the first network device, the second network device, and the third network device may communicate with the terminal device by performing time division multiplexing on the transmitter chain 2 (that is, the service of the first network device, the service of the second network device, and the service of the third network device are processed in parallel on the transmitter chain 2).

Case 13

The first information may include (13) above.

In this case, the first network device may perform corresponding processing based on the ninth indication information.

For example, after receiving the first information (including the ninth indication information), the first network device may deactivate, suspend, or release the connection between the terminal device and the second network device. Further, the terminal device may process a service of the second network by using the transmitter chain 2; the second network device and the third network device communicate with the terminal device by performing time division multiplexing on the transmitter chain 2, and the first network device communicates with the terminal device by using the transmitter chain 1; or the first network device and the third network device communicate with the terminal device by performing time division multiplexing on the transmitter chain 1, and the second network device communicates with the terminal device by using the transmitter chain 2. Alternatively, the first network device and the second network device communicate with the terminal device by performing time division multiplexing on the transmitter chain 1, and the third network device communicates with the terminal device by using the transmitter chain 2.

Case 14

The first information may include (14) above. In other words, the first information may include the tenth indication information, where the tenth indication information is used to indicate that one of the plurality of transmitter chains of the terminal device needs to be occupied to perform communication with the third network device. "Occupied" may be understood as that the transmitter chain is completely occupied by the third network device (for example, the terminal device communicates only with the third network device on the transmitter chain), or may be understood as that the transmitter chain is occupied by the third network device in a time division multiplexing manner (for example, the terminal device communicates with the third network device and the second network device on the transmitter chain in the time division multiplexing manner).

In this case, the first network device may perform corresponding processing based on the tenth indication information.

For example, after receiving the first information (including the tenth indication information), the first network device may suspend or release the connection between the terminal device and the second network device. Further, the terminal device may process a service of the second network by using the transmitter chain 2; the second network device and the third network device communicate with the terminal device by performing time division multiplexing on the transmitter chain 2, and the first network device communicates with the terminal device by using the transmitter chain 1; or the first network device and the third network device communicate with the terminal device by performing time division multiplexing on the transmitter chain 1, and the second network device communicates with the terminal device by using the transmitter chain 2.

It should be noted: (1) Case 1 to Case 14 above are all described by using an example in which the first information includes one of (1) to (14). In another possible case, the first information may alternatively include a plurality of items in (1) to (14). For example, in Case 15, the first information may include (3) and (7) above. In this case, the first network device may perform corresponding processing based on the information about the transmitter chain that needs to be used by the terminal device to communicate with the third network device or establish the connection to the third network device and the third indication information. For example, if the first network device determines, based on the information about the transmitter chain that needs to be used by the terminal device to communicate with the third network device or establish the connection to the third network device, that the transmitter chain 2 needs to be used by the terminal device to communicate with the third network device or establish the connection to the third network device, the first network device may communicate with the terminal device on the transmitter chain 1, and the second network device and the third network device communicate with the terminal device by performing time division multiplexing on the transmitter chain 2. Other possible cases in this embodiment of this application are similar to Case 1 to Case 15 above. Details are not described again.

(2) In this embodiment of this application, if the first network device and the third network device communicate with the terminal device by performing time division multiplexing on a transmitter chain (for example, the transmitter chain 1) of the terminal device, the first network device may determine reconfiguration information of the first network device, and send the reconfiguration information to the terminal device. The reconfiguration information includes a time division multiplexing (time division multiplexing, TDM) pattern (TDM pattern). For example, the TDM pattern may be that a slot 1 to a slot 4 are used by the first network device to schedule the terminal device and a slot 5 to a slot 8 are used by the third network device to schedule the terminal device or that the slot 1 to the slot 4 are used by the terminal device to communicate with the first network device on the transmitter chain 1 and the slot 5 to the slot 8 are used by the terminal device to communicate with the third network device on the transmitter chain 1. If the second network device (the secondary network device) and the third network device communicate with the terminal device by performing time division multiplexing on the transmitter chain (for example, the transmitter chain 1) of the terminal device, the second network device may determine reconfiguration information of the second network device, and send the reconfiguration information to the terminal device. The reconfiguration information includes a TDM pattern. For example, the TDM pattern may be that the slot 1 to the slot 4 are used by the second network device to schedule the terminal device and the slot 5 to the slot 8 are used by the third network device to schedule the terminal device.

(3) In this embodiment of this application, processing performed by the network device corresponds to processing performed by the terminal device. For example, from a perspective of the network device, the network device may deactivate, suspend, or release the connection to the terminal device; from a perspective of the terminal device, the terminal device may deactivate, suspend, or release the connection to the network device. For another example, from a perspective of a network device, the first network device and the third network device communicate with the terminal device by performing time division multiplexing on one transmitter chain of the terminal device; from a perspective of the terminal device, the terminal device may communicate with the first network device and the third network device by performing time division multiplexing on the transmitter chain of the terminal device. In this embodiment of this application, if description is performed from the perspective of the network device, the terminal device may also perform corresponding processing. Similarly, if description is performed from the perspective of the terminal device, the network device may also perform corresponding processing.

(4) The foregoing description is provided by using an example in which the first network device is a master network device. In another possible embodiment, the first network device may alternatively be a secondary network device. For example, when the first network device is a secondary network device, the secondary network device may forward the received first information to the master network device, and then the master network device determines a processing manner. For example, when the first network device is a master network device, after the first network device receives the first information sent by the terminal device, the first network device may send a suspension or release instruction to the secondary network device if the first network device determines to suspend or release the connection between the secondary network device and the terminal device; when the first network device is a secondary network device, the first network device may forward the first information to the master network device after receiving the first information sent by the terminal device, and the master network device may send a suspension or release instruction to the secondary network device if the master network device determines, based on the first information, to suspend or release the connection between the secondary network device and the terminal device.

For example, the method may further include the following steps.

Step 205: If the terminal device determines that the second service ends or the service of the third network device ends, the terminal device sends third information to the first network device, where the third information is used to request to activate the DC or recover the DC, or request to activate an SCG and recover the SCG.

Correspondingly, in step 206, the terminal device receives fourth information sent by the first network device, where the fourth information is used to indicate to activate the DC or recover the DC or activate the SCG and recover the SCG. Further, the terminal device may activate or recover the DC or the SCG based on the fourth information.

In this manner, the first network device can activate or recover DC or transmission of the SCG in time, to improve resource utilization and ensure effective processing of the service of the first network.

It should be noted that the service of the network device described in this embodiment of this application, for example, the service of the first network device, may be understood as a service processed when the terminal device communicates with the first network device; for another example, the service of the second network device, may be understood as a service processed when the terminal device communicates with the second network device; and for another example, the service of the third network device, may be understood as a service processed when the terminal device communicates with the third network device.

For example, a SIM card 1 of the terminal device is in DC mode. If a SIM card 2 triggers data transmission, the terminal device may directly send an SN suspension or release indication message to an MN of the SIM card 1, and indicate that a reason for SN suspension or release is dual SIM concurrency. Alternatively, when a SIM card 2 needs to perform data transmission, the terminal device indicates, to an MN of the SIM card 1 based on a transmission status of the SIM card 2, information about a carrier that needs to be used, so that the MN determines whether a carrier used by the SIM card 2 to perform transmission conflicts with a carrier or a frequency band of an SN. If the carrier used by the SIM card 2 to perform transmission conflicts with the carrier or the frequency band of the SN, the SN may be suspended or released, or the TDM pattern is used on the SN.

For example, if the MN determines, based on the first information, that the SN needs to be suspended or released, the MN may send the SN suspension indication message or the SN release indication message to the terminal device.

For example, after determining that transmission of the SIM card 2 ends, the terminal device may send an SN recovery request message to the MN, to request to recover transmission of the SN.

For example, the MN may send SN recovery indication information to the terminal device, to indicate the terminal device to recover transmission of the SN.

According to the foregoing method, when the terminal device processes the service of the first network in dual connectivity mode, if the terminal device determines that the service of the second network needs to be processed, the terminal device sends the first information to the first network device in the first network. In this way, the first network device can process the dual connectivity of the terminal device based on the first information, so that the terminal device communicates with the third network device or establishes the connection to the third network device to process the second service.

Embodiment 1 is mainly for a scenario in which the terminal device initiates establishment of a connection to the third network device when connecting to two network devices. Embodiment 2 is mainly for a scenario in which a terminal device actively requests, when processing a service in a non-DC mode, a network device to deactivate or suspend DC or suspend an SCG. Embodiment 3 is mainly for a scenario in which a terminal device receives a request that is sent by a network device and that is for entering a dual connectivity mode or establishing an SCG, and rejects the request. It should be noted that names of some information in Embodiment 1, Embodiment 2, and Embodiment 3 may be the same, for example, the first indication information and the second indication information, but the information may have different meanings in Embodiment 1, Embodiment 2, and Embodiment 3. For details, refer to descriptions about information in Embodiment 1, Embodiment 2, and Embodiment 3.

Embodiment 2

Figure 3:
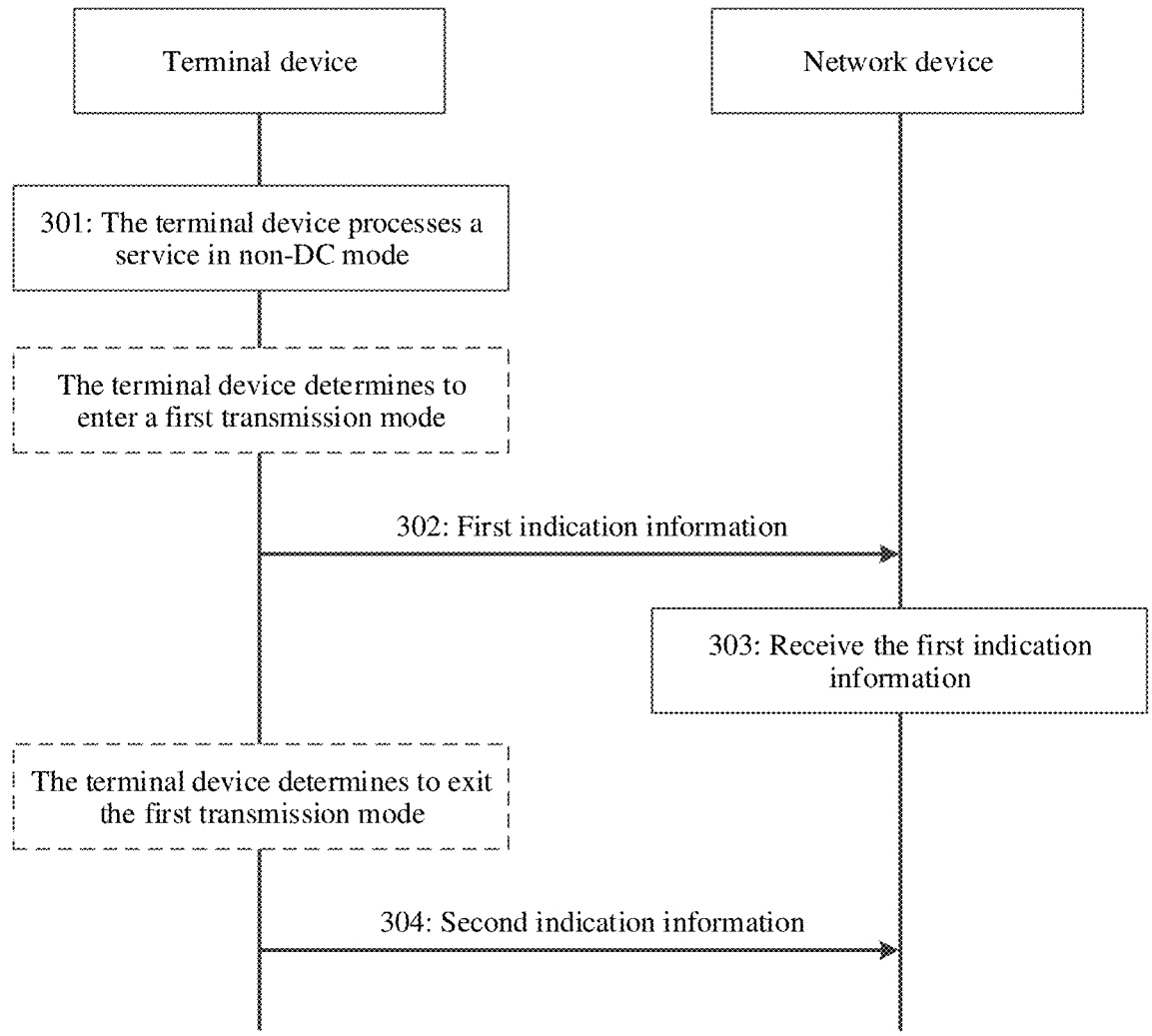
FIG. 3 is a schematic flowchart corresponding to a communication method according to Embodiment 2 of this application.

FIG. 3 is a schematic flowchart corresponding to a communication method according to Embodiment 2 of this application. As shown in FIG. 3, the communication method includes the following steps.

Step 301: A terminal device processes a service in non-DC mode.

For example, the terminal device may include a plurality of transmitter chains. The following mainly uses an example in which the terminal device includes two transmitter chains (referred to as a first transmitter chain and a second transmitter chain) for description.

For example, that a terminal device processes a service in non-DC mode may be understood as that the terminal device is not in DC mode. The terminal device may process the service in non-DC mode in a plurality of manners. For example, the terminal device processes a service of a first network on the first transmitter chain (for example, the terminal device communicates with a network device in the first network on the first transmitter chain), and the second transmitter chain is in idle mode.

Step 302: The terminal device sends first indication information to a network device.

In an example, if the terminal device determines to enter a first transmission mode, the terminal device sends the first indication information to the network device.

For example, the first indication information is used to indicate to deactivate or suspend DC or an SCG, or the first indication information is used to indicate the terminal device to enter the first transmission mode or indicate that the terminal device has entered the first transmission mode. It should be noted that, in this case, that the first indication information is used to indicate to deactivate or suspend DC or an SCG may be understood as indicating a network device not to configure the DC or the SCG for the terminal device or not to activate the DC or the SCG for the terminal device temporarily. A difference between this case and Embodiment 1 above lies in that, in this case, the terminal device does not implement the DC currently, that is, does not perform data transmission in DC mode.

The first transmission mode includes that the terminal device processes the service of the first network on the first transmitter chain of the terminal device, and processes a service of a second network on the second transmitter chain of the terminal device. In this case, that the terminal device sends first indication information to a network device may mean that the terminal device sends the first indication information to the network device in the first network and/or a network device in the second network. Alternatively, the first transmission mode includes that the terminal device processes a service of a first network device on the first transmitter chain of the terminal device, and processes a service of a second network device on the second transmitter chain of the terminal device. In this case, that the terminal device sends first indication information to a network device may mean that the terminal device sends the first indication information to the first network device and/or the second network device.

In an example, the first transmission mode may also be referred to as a dual SIM concurrency mode or a dual SIM concurrency manner. That the terminal device enters the first transmission mode may be understood as dual SIM concurrency activation of the terminal device, and that the terminal device exits the first transmission mode may be understood as dual SIM concurrency deactivation of the terminal device. For example, the first indication information may be a dual SIM concurrency activation indication.

Step 303: The network device receives the first indication information, and may no longer send, to the terminal device based on the first indication information, a request for entering the dual connectivity mode or establishing the SCG.

For example, the method may further include the following step.

Step 304: The terminal device sends second indication information to the network device.

In an example, if the terminal device determines to exit the first transmission mode, the terminal device sends the second indication information to the network device.

For example, the second indication information is used to indicate to activate or recover the DC or the SCG, or the second indication information is used to indicate the terminal device to exit the first transmission mode or indicate that the terminal device has exited the first transmission mode. For example, the second indication information may be a dual SIM concurrency deactivation indication. It should be noted that, in this case, that the second indication information is used to indicate to activate or recover the DC or the SCG may be understood as indicating that the network device may configure the SCG or the DC for the terminal device or indicating that the network device may activate the SCG or the DC for the terminal device. It is emphasized herein that the network device "may" configure the SCG or the DC for the terminal device or activate the SCG or the DC for the terminal device. This is different from Embodiment 1.

In an example, after entering the dual SIM concurrency mode, the terminal device may separately send dual-active activation indication information or DC mode suspension indication information to the network device in the first network and the network device in the second network. After exiting the dual SIM concurrency mode, the terminal device may separately send dual SIM concurrency deactivation indication information to the network device in the first network and the network device in the second network.

According to the foregoing method, the terminal device sends the first indication information to the network device if the terminal device determines to enter the first transmission mode, to effectively avoid that the network device still requests to enter the dual connectivity or requests to establish the SCG after the terminal device enters the first transmission mode.

Embodiment 3

Figure 4:
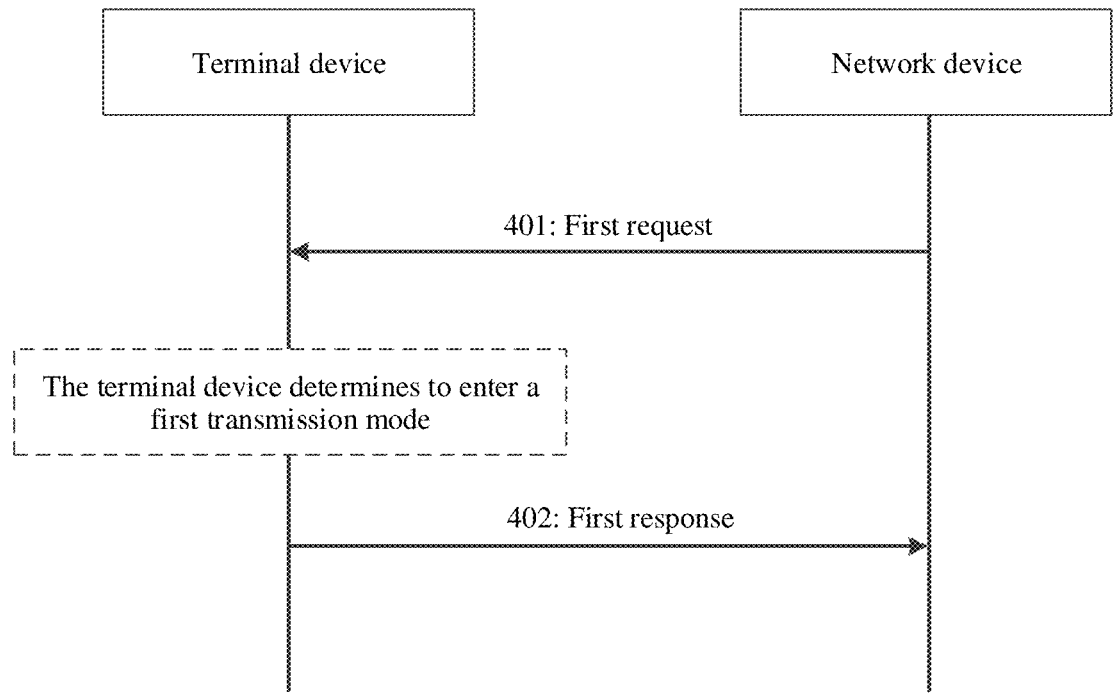
FIG. 4 is a schematic flowchart corresponding to a communication method according to Embodiment 3 of this application.

FIG. 4 is a schematic flowchart corresponding to a communication method according to Embodiment 3 of this application. As shown in FIG. 4, the communication method includes the following steps.

Step 401: A network device sends a first request to a terminal device, where the first request is used to request to enter a dual connectivity mode or request to establish an SCG.

For example, the network device is a network device in a first network or a network device in a second network.

Step 402: The terminal device receives the first request sent by the network device, and sends a first response to the network device, where the first response is used to reject the first request.

For example, if the terminal device determines to enter a first transmission mode, the terminal device sends the first response to the network device.

The first transmission mode includes that the terminal device is in transmitter chain capability limited mode in the first network or the second network. That the terminal device is in transmitter chain capability limited mode in the first network or the second network includes that the terminal device processes a service of the first network on a first transmitter chain of the terminal device, and processes a service of the second network on a second transmitter chain of the terminal device, or that the terminal device processes a service of a first network device on a first transmitter chain of the terminal device, and processes a service of a second network device on a second transmitter chain of the terminal device. In this case, the network device may be the first network device or the second network device, the first network device may be a network device in the first network, and the second network device may be a network device in the second network.

For example, the first request may be a secondary base station increasing request, and the first response may be a secondary base station increasing failure; the first request may be a secondary base station establishment request, and the first response may be a secondary base station establishment failure; or the first request and the first response may have other possible names. This is not specifically limited.

For example, the first response may include at least one of (1) to (6) below: (1) first indication information, where the first indication information is used to indicate the terminal device to enter the first transmission mode or indicate that the terminal device has entered the first transmission mode; (2) second indication information, where the second indication information is used to indicate that a plurality of transmitter chains of the terminal device are all occupied; (3) third indication information, where the third indication information is used to indicate that the first transmitter chain of the terminal device is occupied to perform communication with a network device in the second network; (4) information about a transmitter chain used by the terminal device to communicate with a network device in the first network; (5) information about a transmitter chain used by the terminal device to communicate with the network device in the second network; and (6) information about a transmitter chain used by the terminal device to perform parallel transmission with the network device in the first network and the network device in the second network.

In this embodiment of this application, the foregoing content included in the first response may be understood as information about a reason for rejecting the first request. For example, when the first response includes (1), after the network device receives the first response, the network device may learn that because the terminal device is to enter the first transmission mode or has entered the first transmission mode, the network device cannot enter the dual connectivity mode or establish the SCG. For another example, when the first response includes (2), after the network device receives the first response, the network device may learn that because the plurality of transmitter chains of the terminal device (if the terminal device has two transmitter chains, the plurality of transmitter chains herein may refer to two transmitter chains) are all occupied, the network device cannot enter the dual connectivity mode or establish the SCG. For another example, when the first response includes (3), after the network device receives the first response, the network device may learn that because the first transmitter chain of the terminal device is occupied to perform communication with the network device in the second network, the network device cannot enter the dual connectivity mode or establish the SCG. The first transmitter chain herein may be a specified transmitter chain of the terminal device. For another example, when the first response includes (4) and/or (5), after the network device receives the first response, the network device may learn of the information about the transmitter chain used by the terminal device to communicate with a network device in the first network and/or the information about the transmitter chain used by the terminal device to communicate with the network device in the second network. For another example, when the first response includes (6), after the network device receives the first response, the network device may learn of the information about the transmitter chain used by the terminal device to perform parallel transmission with the network device in the first network and the network device in the second network.

For example, the terminal device may send information about the plurality of transmitter chains of the terminal device to the network device, where information about the transmitter chain may include information about a carrier supported by the transmitter chain and/or number information of the transmitter chain.

In an example, after receiving a DC establishment request of an MN, a SIM card 1 of the terminal device may reject SN increasing. For example, in dual SIM concurrency mode, if the terminal device receives an SN increasing request message sent by the network device, the terminal device may reject an SN increasing request and indicate, to the network device, that a rejection cause is dual SIM concurrency. After dual SIM concurrency ends, the terminal device may indicate, to the network device, that dual SIM concurrency ends.

In solution 3, if the terminal device determines to enter the first transmission mode, the terminal device may reject the first request if the terminal device receives the first request sent by the network device, to ensure that the first transmission mode of the terminal device is not affected.

For Embodiment 1 to Embodiment 3 above, it should be noted: (1) Step numbers in FIG. 2 to FIG. 4 are numbered only for ease of description, and do not constitute a limitation on an execution sequence of the steps. There is no strict execution sequence of steps that have no time sequence dependency in the foregoing steps, and a sequence may be adjusted according to an actual situation. The steps in FIG. 2 to FIG. 4 are not necessary steps in an execution procedure, and may be deleted according to an actual requirement during specific implementation.

(2) Embodiment 1, Embodiment 2, and Embodiment 3 may be separately implemented, or may be implemented in combination, for example, Embodiment 1 and Embodiment 2 are implemented in combination, or Embodiment 1 and Embodiment 3 are implemented in combination. In the embodiments of this application, for some content in Embodiment 1, Embodiment 2, and Embodiment 3, refer to each other. For example, for that the terminal device registers with the first network and the second network in Embodiment 2 and Embodiment 3, refer to descriptions in Embodiment 1. For each of Embodiment 1 to Embodiment 3, when there are a plurality of possible implementations, the embodiments of this application describe only a difference between the plurality of possible implementations. For other content, refer to each other.

(3) In Embodiment 1, Embodiment 2, and Embodiment 3 above, descriptions are provided mainly by using an example in which the terminal device is a terminal device supporting dual SIM cards. The embodiments of this application are also applicable to an operation performed when another terminal device is connected to a plurality of network devices in one or more networks. For example, the embodiments of this application are also applicable to a scenario in which a terminal device supporting a single SIM card initiates establishment of a connection to the third network device in a process of dual connectivity to two network devices.

The foregoing describes, mainly from the perspective of interaction between the network device and the terminal device, the solutions provided in this application. It may be understood that to implement the foregoing functions, each network element includes a corresponding hardware structure and/or software module (or unit) for implementing each function. A person skilled in the art should be easily aware that, in combination with the examples described in the embodiments disclosed in this specification, units and algorithm steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

The foregoing describes, mainly from the perspective of interaction between the network device and the terminal device, the solutions provided in this application. It may be understood that to implement the foregoing functions, each network element includes a corresponding hardware structure and/or software module (or unit) for implementing each function. A person skilled in the art should be easily aware that, in combination with the examples described in the embodiments disclosed in this specification, units and algorithm steps may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 5:
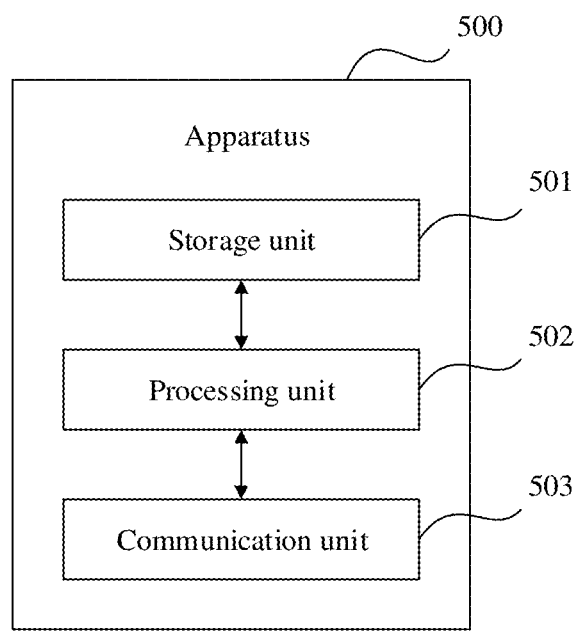
FIG. 5 is a schematic block diagram of a terminal device according to an embodiment of the present invention.

When an integrated unit (module) is used, FIG. 5 is a possible example block diagram of a communication apparatus according to an embodiment of this application. The apparatus 500 may exist in a form of software. The apparatus 500 may include a processing unit 502 and a communication unit 503. The processing unit 502 is configured to control and manage actions of the apparatus 500. The communication unit 503 is configured to support communication between the apparatus 500 and another network entity. Optionally, the communication unit 503 is also referred to as a transceiver unit, and may include a receiving unit and/or a sending unit, respectively configured to perform a receiving operation and a sending operation. The apparatus 500 may further include a storage unit 501, configured to store program code and/or data of the apparatus 500.

The apparatus 500 may be the terminal device in any one of the foregoing embodiments, or may be a semiconductor chip disposed in the terminal device. The processing unit 502 may support the apparatus 500 in performing actions of the terminal device in the foregoing method examples. Alternatively, the processing unit 502 mainly performs an internal action of the terminal device in the method examples, and the communication unit 503 may support communication between the apparatus 500 and the network device.

Specifically, in a possible embodiment, the processing unit 502 is configured to establish a first connection to a first network device and a second connection to a second network device, where the first connection and the second connection are used to process a first service. The communication unit 503 is configured to send first information to the first network device when the processing unit 502 determines that a second service needs to be processed, where the first information is used to request to deactivate, suspend, or release the first connection or the second connection, or the first information is used to indicate the communication apparatus to communicate with a third network device or establish a third connection to the third network device, where the third connection is used to process the second service, and the second service is different from the first service.

In a possible design, the first network device and the second network device are network devices in a first network, and the third network device is a network device in a second network; and that the second service is different from the first service includes: the first service is a service of the first network, and the second service is a service of the second network.

In a possible design, the communication apparatus includes a first communication card and a second communication card, the first communication card registers with the first network, and the second communication card registers with the second network; and that the second service is different from the first service further includes: the first service is a service corresponding to the first communication card, and the second service is a service corresponding to the second communication card.

In a possible design, the first information includes at least one of the following:
secondary cell group SCG failure indication information or master cell group MCG failure indication information;
information about a carrier that needs to be used by the communication apparatus to communicate with the third network device or establish the connection to the third network device;
information about a transmitter chain that needs to be used by the communication apparatus to communicate with the third network device or establish the connection to the third network device;
information about a transmitter chain on which parallel transmission is to be performed or parallel transmission is performed and that is in a plurality of transmitter chains of the communication apparatus;
first indication information, where the first indication information is used to indicate that the communication apparatus needs to process the first service and the second service in parallel;
second indication information, where the second indication information is used to indicate that a terminal needs to process a service of the first network device and a service of the third network device in parallel;
third indication information, where the third indication information is used to indicate that the communication apparatus needs to process a service of the second network device and the service of the third network device in parallel;
fourth indication information, where the fourth indication information is used to indicate that the communication apparatus needs to process the service of the first network device, the service of the second network device, and the service of the third network device in parallel;
fifth indication information, where the fifth indication information is used to indicate that the communication apparatus needs to process the first service and the second service in parallel on one of the plurality of transmitter chains of the communication apparatus;
sixth indication information, where the sixth indication information is used to indicate that the communication apparatus needs to process the service of the first network device and the service of the third network device in parallel on one of the plurality of transmitter chains of the communication apparatus;
seventh indication information, where the seventh indication information is used to indicate that the communication apparatus needs to process the service of the second network device and the service of the third network device in parallel on one of the plurality of transmitter chains of the communication apparatus;
eighth indication information, where the eighth indication information is used to indicate that the communication apparatus needs to process the service of the first network device, the service of the second network device, and the service of the third network device in parallel on one of the plurality of transmitter chains of the communication apparatus;
ninth indication information, where the ninth indication information is used to indicate that the communication apparatus needs to process the first service on a first transmitter chain in the plurality of transmitter chains of the communication apparatus, and process the second service on a second transmitter chain in the plurality of transmitter chains; the ninth indication information is used to indicate that the communication apparatus needs to process the service of the first network device and/or the service of the second network device on the first transmitter chain, and process the service of the third network device on the second transmitter chain in the plurality of transmitter chains; the ninth indication information is used to indicate that the communication apparatus needs to process the service of the first network device and/or the service of the third network device on the first transmitter chain, and process the service of the second network device on the second transmitter chain in the plurality of transmitter chains; or the ninth indication information is used to indicate that the communication apparatus needs to process the service of the second network device and/or the service of the third network device on the first transmitter chain, and process the service of the first network device on the second transmitter chain in the plurality of transmitter chains; and tenth indication information, where the tenth indication information is used to indicate that one of the plurality of transmitter chains of the communication apparatus needs to be occupied to perform communication with the third network device.

In a possible design, the communication unit 503 is further configured to:
sending information about the plurality of transmitter chains of the communication apparatus to the first network device.

In a possible design, information about the transmitter chain includes a number of the transmitter chain or information about a carrier supported by the transmitter chain.

In a possible design, the information about the carrier supported by the transmitter chain includes at least one of the following: frequency information of the carrier supported by the transmitter chain, frequency band information of the carrier supported by the transmitter chain, and a number of the carrier supported by the transmitter chain.

In a possible design, the apparatus further includes:

the communication apparatus receives second information sent by the first network device, where the second information is used to indicate to deactivate, suspend, or release the second connection; and the communication apparatus deactivates, suspends, or releases the second connection based on the second information.

In a possible design, if the processing unit 502 determines that the second service ends or the service of the third network device ends, the communication unit 503 is further configured to send third information to the first network device, where the third information is used to request to activate DC or recover the DC, or request to activate an SCG and recover the SCG.

In another possible embodiment, the processing unit 502 is configured to generate first indication information, where the communication apparatus is not in dual connectivity mode. The communication unit 503 is configured to send the first indication information to the network device, where the first indication information is used to indicate to deactivate or suspend DC or an SCG.

In a possible design, the communication unit 503 is specifically configured to send the first indication information to the network device when the processing unit 502 determines to enter a first transmission mode, where the first transmission mode includes that the communication apparatus processes a service of a first network on a first transmitter chain of the communication apparatus, and processes a service of a second network on a second transmitter chain of the communication apparatus, where the network device is a network device in the first network or a network device in the second network; or the first transmission mode includes that the communication apparatus processes a service of a first network device on a first transmitter chain of the communication apparatus, and processes a service of a second network device on a second transmitter chain of the communication apparatus, where the network device is the first network device or the second network device.

In a possible design, the communication unit 503 is further configured to send second indication information to the network device, where the second indication information is used to indicate to activate or recover the DC or the SCG.

In a possible design, the communication unit 503 is specifically configured to send the second indication information to the network device when the processing unit 502 determines to exit the first transmission mode.

Figure 6:
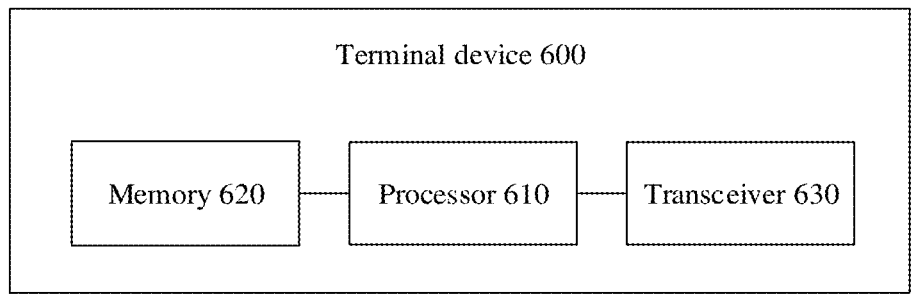
FIG. 6 is another schematic block diagram of a terminal device according to an embodiment of the present invention.

As shown in FIG. 6, an embodiment of the present invention further provides a terminal device 600. The terminal device 600 includes a processor 610, a memory 620, and a transceiver 630. The memory 620 stores instructions or a program, and the memory 620 is configured to implement a function of the storage unit 501 in the foregoing embodiment. The processor 610 is configured to execute the instructions or the program stored in the memory 620. When the instructions or the program stored in the memory 620 is executed, the processor 610 is configured to perform an operation performed by the processing unit 502 in the foregoing embodiment, and the transceiver 630 is configured to perform an operation performed by the communication unit 503 in the foregoing embodiment.

It should be understood that the terminal device 500 or the terminal device 600 according to the embodiments of the present invention may correspond to the terminal device in the communication methods (FIG. 2 to FIG. 4) in the embodiments of the present invention, and operations and/or functions of the modules in the terminal device 500 or the terminal device 600 are separately used to implement corresponding procedures of the methods in FIG. 2 to FIG. 4. For brevity, details are not described herein again.

Figure 7:
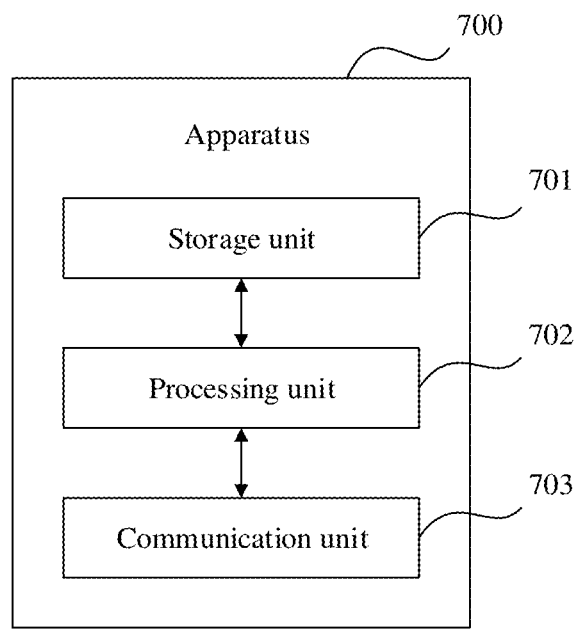
FIG. 7 is a schematic block diagram of a network device according to an embodiment of the present invention.

When an integrated unit (module) is used, FIG. 7 is a possible example block diagram of another apparatus according to an embodiment of this application. The apparatus 700 may exist in a form of software. The apparatus 700 may include a processing unit 702 and a communication unit 703. The processing unit 702 is configured to control and manage actions of the apparatus 700. The communication unit 703 is configured to support communication between the apparatus 700 and another network entity. Optionally, the communication unit 703 is also referred to as a transceiver unit, and may include a receiving unit and/or a sending unit, respectively configured to perform a receiving operation and a sending operation. The apparatus 700 may further include a storage unit 701, configured to store program code and/or data of the apparatus 700.

The apparatus 700 may be the network device in any one of the foregoing embodiments (for example, the network device is the first network device in Embodiment 1), or may be a semiconductor chip disposed in the network device. The processing unit 702 may support the apparatus 700 in performing actions of the network device in the foregoing method examples. Alternatively, the processing unit 702 mainly performs an internal action of the network device in the method examples, and the communication unit 703 may support communication between the apparatus 700 and a terminal device.

Specifically, in an embodiment, the processing unit 702 is configured to establish a first connection to a communication device, where the first connection and a second connection are used to process a first service, and the second connection is a connection between a second network device and the communication device. The communication unit 703 is configured to receive first information sent by the communication device, where the first information is used to request to deactivate, suspend, or release the first connection or the second connection, or the first information is used to indicate the communication device to communicate with a third network device or establish a third connection to the third network device, where the third connection is used to process a second service, and the second service is different from the first service.

In a possible design, the apparatus 700 is a first network device, the first network device and the second network device are network devices in a first network, and the third network device is a network device in a second network; and that the second service is different from the first service includes: the first service is a service of the first network, and the second service is a service of the second network.

In a possible design, the communication device includes a first communication card and a second communication card, the first communication card registers with the first network, and the second communication card registers with the second network; and that the second service is different from the first service further includes: the first service is a service corresponding to the first communication card, and the second service is a service corresponding to the second communication card.

In a possible design, the first information includes at least one of the following:

secondary cell group SCG failure indication information or master cell group MCG failure indication information;

information about a carrier that needs to be used by the communication device to communicate with the third network device or establish the connection to the third network device;

information about a transmitter chain that needs to be used by the communication device to communicate with the third network device or establish the connection to the third network device;

information about a transmitter chain on which parallel transmission is to be performed or parallel transmission is performed and that is in a plurality of transmitter chains of the communication device;

first indication information, where the first indication information is used to indicate that the communication device needs to process the first service and the second service in parallel;

second indication information, where the second indication information is used to indicate that the communication device needs to process a service of the first network device and a service of the third network device in parallel;

third indication information, where the third indication information is used to indicate that the communication device needs to process a service of the second network device and the service of the third network device in parallel;

fourth indication information, where the fourth indication information is used to indicate that the communication device needs to process the service of the first network device, the service of the second network device, and the service of the third network device in parallel;

fifth indication information, where the fifth indication information is used to indicate that the communication device needs to process the first service and the second service in parallel on one of the plurality of transmitter chains of the communication device;

sixth indication information, where the sixth indication information is used to indicate that the communication device needs to process the service of the first network device and the service of the third network device in parallel on one of the plurality of transmitter chains of the communication device;

seventh indication information, where the seventh indication information is used to indicate that the communication device needs to process the service of the second network device and the service of the third network device in parallel on one of the plurality of transmitter chains of the communication device;

eighth indication information, where the eighth indication information is used to indicate that the communication device needs to process the service of the first network device, the service of the second network device, and the service of the third network device in parallel on one of the plurality of transmitter chains of the communication device;

ninth indication information, where the ninth indication information is used to indicate that the communication device needs to process the first service on a first transmitter chain in the plurality of transmitter chains of the communication device, and process the second service on a second transmitter chain in the plurality of transmitter chains; the ninth indication information is used to indicate that the communication device needs to process the service of the first network device and/or the service of the second network device on the first transmitter chain, and process the service of the third network device on the second transmitter chain in the plurality of transmitter chains; the ninth indication information is used to indicate that the communication device needs to process the service of the first network device and/or the service of the third network device on the first transmitter chain, and process the service of the second network device on the second transmitter chain in the plurality of transmitter chains; or the ninth indication information is used to indicate that the communication device needs to process the service of the second network device and/or the service of the third network device on the first transmitter chain, and process the service of the first network device on the second transmitter chain in the plurality of transmitter chains; and tenth indication information, where the tenth indication information is used to indicate that one of the plurality of transmitter chains of the communication device needs to be occupied to perform communication with the third network device.

In a possible design, the communication unit 703 is further configured to receive information that is about the plurality of transmitter chains of the communication device and that is sent by the communication device.

In a possible design, information about the transmitter chain includes a number of the transmitter chain or information about a carrier supported by the transmitter chain.

In a possible design, the information about the carrier supported by the transmitter chain includes at least one of the following: frequency information of the carrier supported by the transmitter chain, frequency band information of the carrier supported by the transmitter chain, and a number of the carrier supported by the transmitter chain.

In a possible design, the communication unit 703 is further configured to send second information to the communication device, where the second information is used to indicate to deactivate, suspend, or release the second connection.

In a possible design, the communication unit 703 is further configured to receive third information sent by the communication device, where the third information is used to request to activate DC or recover the DC, or request to activate an SCG and recover the SCG.

Figure 8:
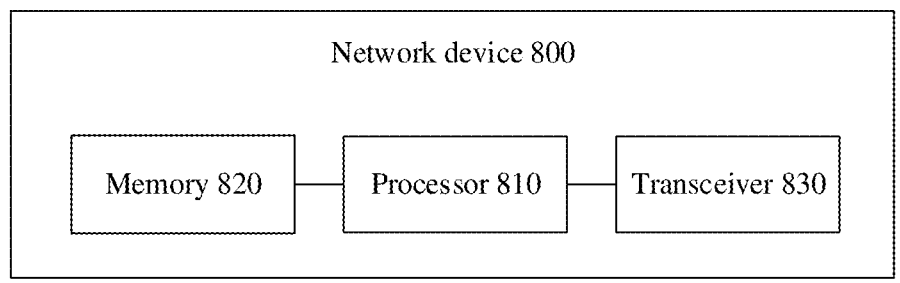
FIG. 8 is another schematic block diagram of a network device according to an embodiment of the present invention.

As shown in FIG. 8, an embodiment of the present invention further provides a network device 800. The network device 800 includes a processor 810, a memory 820, and a transceiver 830. The memory 820 stores instructions or a program, and the memory 820 is configured to implement a function of the storage unit 701 in the foregoing embodiment. The processor 810 is configured to execute the instructions or the program stored in the memory 820. When the instructions or the program stored in the memory 820 is executed, the processor 810 is configured to perform an operation performed by the processing unit 702 in the foregoing embodiment, and the transceiver 830 is configured to perform an operation performed by the communication unit 703 in the foregoing embodiment.

It should be understood that the network device 700 or the network device 800 according to the embodiments of the present invention may correspond to the network device in the communication methods (FIG. 2 to FIG. 4) in the embodiments of the present invention, and operations and/or functions of the modules in the network device 700 or the network device 800 are separately used to implement corresponding procedures of the methods in FIG. 2 to FIG. 4. For brevity, details are not described herein again.

An embodiment of this application further provides a communication apparatus. The communication apparatus may be a terminal device, or may be a circuit. The communication apparatus may be configured to perform actions performed by the terminal device in the foregoing method embodiments.

Figure 9:
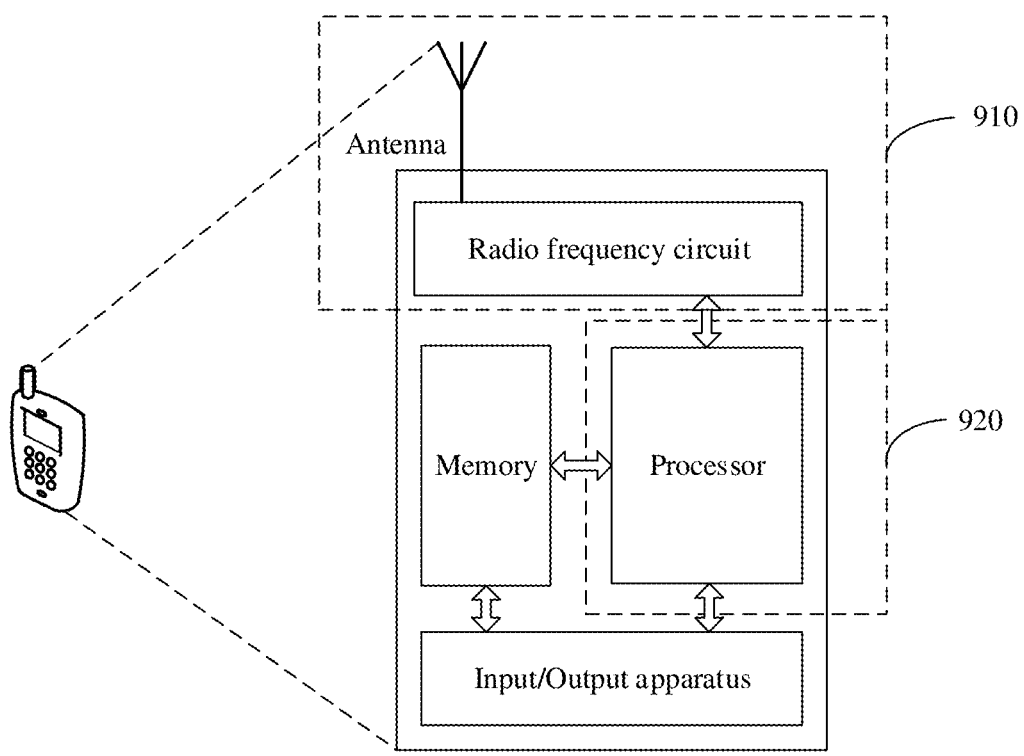
FIG. 9 is a schematic diagram of a structure of a terminal device according to an embodiment of this application.

When the communication apparatus is a terminal device, FIG. 9 is a simplified schematic diagram of a structure of a terminal device. For ease of understanding and convenience of figure illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and/or receive a radio frequency signal in a form of an electromagnetic wave. The input/output apparatus, for example, a touchscreen, a display, or a keyboard, is mainly configured to receive data input by a user, and output data to the user. It should be noted that some types of terminal devices may have no input/output apparatus.

When the processor needs to send data, the processor performs baseband processing on the to-be-sent data, and outputs a baseband signal to the radio frequency circuit. After performing radio frequency processing on the baseband signal, the radio frequency circuit transmits a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 9 shows only one memory and processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have receiving and sending functions may be considered as a transceiver unit (or a communication unit) of the terminal device, and the processor having a processing function may be considered as a processing unit of the terminal device. As shown in FIG. 9, the terminal device includes a transceiver unit 910 and a processing unit 920. The transceiver unit may also be referred to as a transceiver, a transceiver apparatus, or the like. The processing unit may also be referred to as a processor, a processing board, a processing module, a processing apparatus, or the like. Optionally, a component configured to implement a receiving function in the transceiver unit 910 may be considered as a receiving unit, and a component configured to implement a sending function in the transceiver unit 910 may be considered as a sending unit. In other words, the transceiver unit 910 includes the receiving unit and the sending unit. The transceiver unit may also be sometimes referred to as a transceiver, a transceiver, a transceiver circuit, or the like. The receiving unit may also be sometimes referred to as a receiver, a receiver circuit, or the like. The sending unit may also be sometimes referred to as a transmitter, a transmitter circuit, or the like.

It should be understood that the transceiver unit 910 is configured to perform a sending operation and a receiving operation on a terminal device side in the foregoing method embodiments, and the processing unit 920 is configured to perform an operation other than the sending operation and the receiving operation on the terminal device in the foregoing method embodiments.

For example, in an implementation, the transceiver unit 910 is configured to perform the sending operation and the receiving operation on the terminal device side in step 202, step 205, and step 206 in FIG. 2, and/or the transceiver unit 910 is further configured to perform other sending steps and receiving steps on the terminal device side in the embodiments of this application. The processing unit 920 is configured to perform step 201 in FIG. 2, and/or the processing unit 920 is further configured to perform another processing step on the terminal device side in the embodiments of this application.

For another example, in another implementation, the transceiver unit 910 is configured to perform the sending operation on the terminal device side in step 302 and step 304 in FIG. 3, and/or the transceiver unit 910 is further configured to perform other sending steps and receiving steps on the terminal device side in the embodiments of this application. The processing unit 920 is configured to perform step 301 in FIG. 3 and/or the processing unit 920 is further configured to perform another processing step on the terminal device side in the embodiments of this application.

For still another example, in still another implementation, the transceiver unit 910 is configured to perform the sending operation on the terminal device side in step 402 or the receiving operation on the terminal device side in step 401 in FIG. 4, and/or the transceiver unit 910 is further configured to perform other sending steps and receiving steps on the terminal device side in the embodiments of this application. The processing unit 920 is configured to perform another processing step on the terminal device side in the embodiments of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 10:
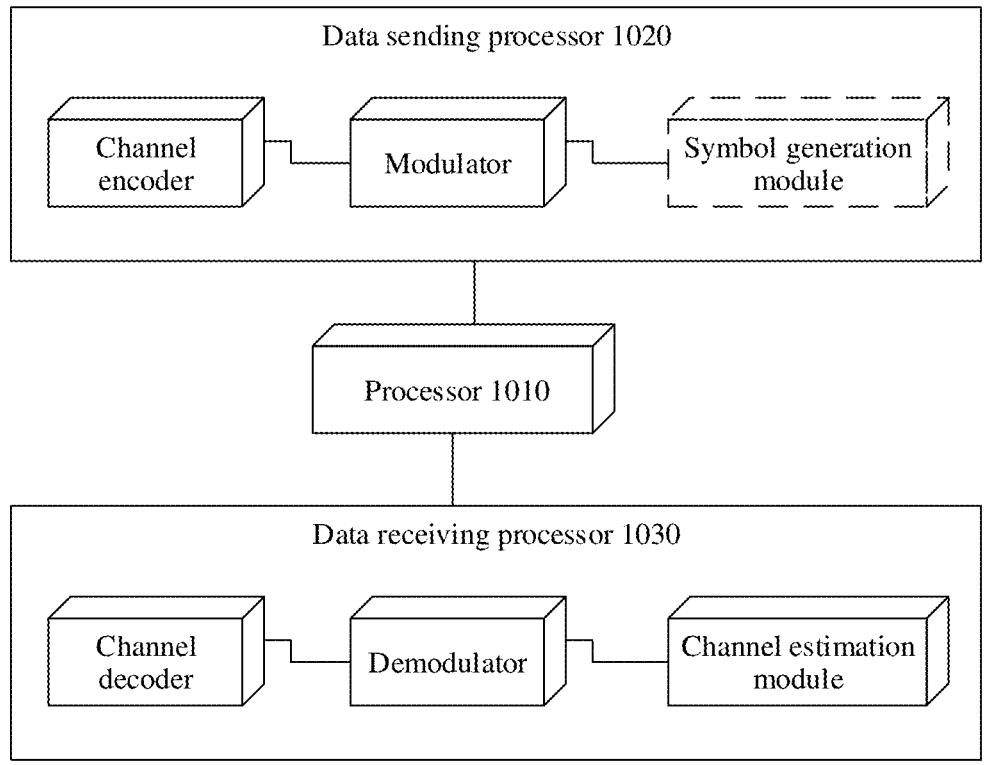
FIG. 10 is a schematic block diagram of a communication apparatus according to an embodiment of this application.

When the communication apparatus in this embodiment is a terminal device, refer to a device shown in FIG. 10. In an example, the device can implement a function similar to that of the processor 610 in FIG. 6. In FIG. 10, the device includes a processor 1010, a data sending processor 1020, and a data receiving processor 1030. The processing unit 502 in the foregoing embodiment may be the processor 1010 in FIG. 10, and implements a corresponding function. The communication unit 503 in the foregoing embodiment may be the data sending processor 1020 and/or the data receiving processor 1030 in FIG. 10. Although FIG. 10 shows a channel encoder, a modulator, a symbol generation module, a channel decoder, a demodulator, and a channel estimation module, it may be understood that the modules are merely examples, and do not constitute a limitation on this embodiment.

Figure 11:
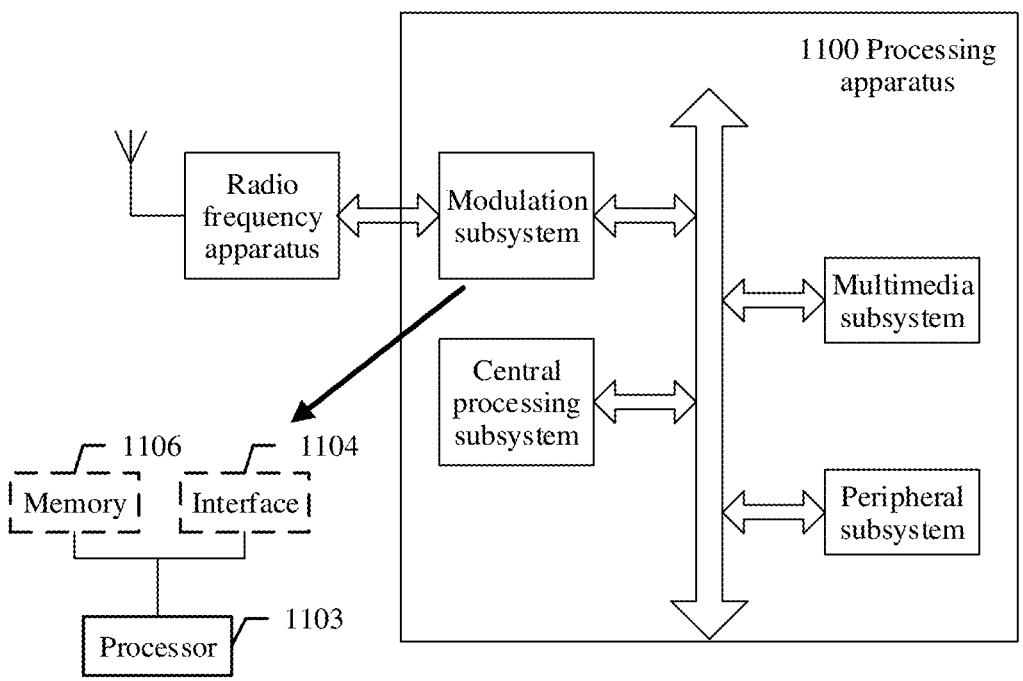
FIG. 11 is another schematic block diagram of a communication apparatus according to an embodiment of this application.

FIG. 11 shows another form of this embodiment. A processing apparatus 1100 includes modules such as a modulation subsystem, a central processing subsystem, and a peripheral subsystem. A communication apparatus in this embodiment may be used as the modulation subsystem in the processing apparatus 1100. Specifically, the modulation subsystem may include a processor 1103 and an interface 1104. The processor 1103 implements a function of the processing unit 502, and the interface 1104 implements a function of the communication unit 503. In another variation, the modulation subsystem includes a memory 1106, a processor 1103, and a program that is stored in the memory 1106 and that can be run on the processor. When executing the program, the processor 1103 implements the methods on the terminal device side in the foregoing method embodiments. It should be noted that the memory 1106 may be non-volatile or volatile. The memory 1106 may be located in the modulation subsystem, or may be located in the processing apparatus 1100, provided that the memory 1106 may be connected to the processor 1103.

In another form of this embodiment, a computer-readable storage medium is provided. The computer-readable storage medium stores instructions. When the instructions are executed, the methods on the terminal device side in the foregoing method embodiments are performed.

In another form of this embodiment, a computer program product including instructions is provided. When the instructions are executed, the methods on the terminal device side in the foregoing method embodiments are performed.

Figure 12:
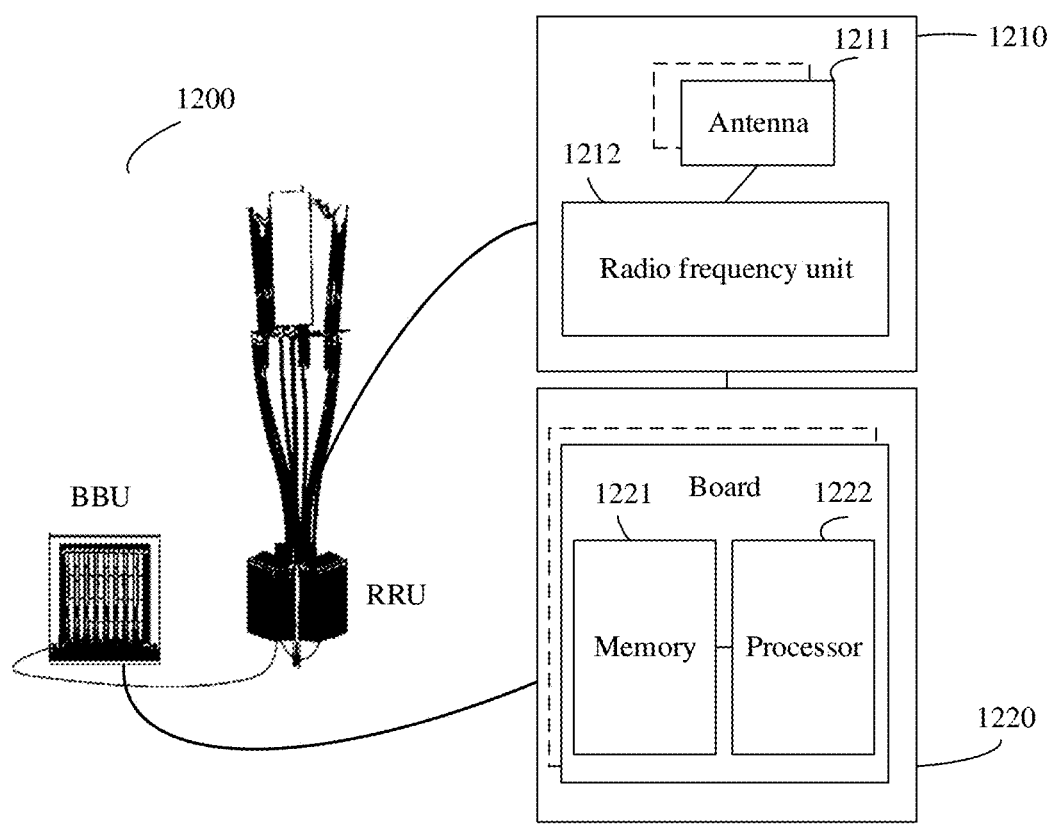
FIG. 12 is a schematic diagram of a structure of a network device according to an embodiment of this application.

When the apparatus in this embodiment is a network device, the network device may be shown in FIG. 12. An apparatus 1200 includes one or more radio frequency units, such as a remote radio unit (remote radio unit, RRU) 1210 and one or more baseband units (baseband unit, BBU) (which may also be referred to as a digital unit, DU) 1220. The RRU 1210 may be referred to as a communication unit, and corresponds to the communication unit 703 in FIG. 7. Optionally, the communication unit may also be referred to as a transceiver, a transceiver circuit, or the like, and may include at least one antenna 1211 and a radio frequency unit 1212. The RRU 1210 is mainly configured to send and receive a radio frequency signal, and perform conversion between the radio frequency signal and a baseband signal. For example, the RRU 1210 is configured to send indication information to a terminal device. The BBU 1220 is mainly configured to perform baseband processing, control a base station, and so on. The RRU 1210 and the BBU 1220 may be physically disposed together, or may be physically disposed separately, that is, the base station is a distributed base station.

The BBU 1220 is a control center of the base station, or may be referred to as a processing module. The BBU 1220 may correspond to a processing module 810 in FIG. 8, and is mainly configured to implement a baseband processing function, for example, channel coding, multiplexing, modulation, or spreading. For example, the BBU (the processing module) may be configured to control the base station to perform an operation procedure related to the network device in the foregoing method embodiments, for example, generate the foregoing indication information.

In an example, the BBU 1220 may consist of one or more boards, and a plurality of boards may jointly support a radio access network (for example, an LTE network) having a single access standard, or may separately support radio access networks (for example, an LTE network, a 5G network, or another network) having different access standards. The BBU 1220 further includes a memory 1221 and a processor 1222. The memory 1221 is configured to store necessary instructions and data. The processor 1222 is configured to control the base station to perform a necessary action, for example, is configured to control the base station to perform the operation procedure related to the network device in the foregoing method embodiments. The memory 1221 and the processor 1222 may serve one or more boards. In other words, the memory and the processor may be separately disposed on each board. Alternatively, a plurality of boards may share a same memory and a same processor. In addition, a necessary circuit may be further disposed on each board.

In another form of this embodiment, a computer-readable storage medium is provided. The computer-readable storage medium stores instructions. When the instructions are executed, the methods on the network device side in the foregoing method embodiments are performed.

In another form of this embodiment, a computer program product including instructions is provided. When the instructions are executed, the methods on the network device side in the foregoing method embodiments are performed.

In an implementation process, the steps of the methods provided in the embodiments may be completed by using a hardware integrated logical circuit in the processor or by using instructions in a form of software. The steps of the methods disclosed with reference to the embodiments of this application may be directly performed and completed by a hardware processor, or may be performed and completed by using a combination of hardware and software modules in the processor.

It should be noted that the processor in the embodiments of this application may be an integrated circuit chip, and has a signal processing capability. In an implementation process, steps in the foregoing method embodiments may be completed by using a hardware integrated logical circuit in the processor or by using instructions in a form of software. The processor may be a general-purpose central processing unit (central processing unit, CPU), a general-purpose processor, digital signal processing (digital signal processing, DSP), an application specific integrated circuit (application specific integrated circuit, ASIC), a field programmable gate array (field programmable gate array, FPGA) or another programmable logic device, a transistor logic device, a hardware component, or any combination thereof. Alternatively, the processor may be a combination implementing a computing function, for example, a combination including one or more microprocessors or a combination of a DSP and a microprocessor. The general-purpose processor may be a microprocessor, or the processor may be any conventional processor or the like.

It may be understood that, the memory or the storage unit in the embodiments of this application may be a volatile memory or a nonvolatile memory, or may include both the volatile memory and the nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external buffer. Through example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the systems and methods described in this specification include but are not limited to these memories and any memory of another suitable type.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer programs or instructions. When the computer programs or instructions are loaded and executed on the computer, the procedure or functions in the embodiments of this application are all or partially performed. The computer may be a general-purpose computer, a special-purpose computer, a computer network, or another programmable apparatus. The computer programs or instructions may be stored in a computer-readable storage medium, or may be transmitted by using the computer-readable storage medium. The computer-readable storage medium may be any usable medium accessible by a computer, or a data storage device such as a server integrating one or more usable media. The usable medium may be a magnetic medium, for example, a floppy disk, a hard disk, or a magnetic tape, may be an optical medium, for example, a DVD, or may be a semiconductor medium, for example, a solid-state drive (solid-state drive, SSD).

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logic apparatus, a discrete gate or transistor logic, a discrete hardware component, or a design of any combination thereof. The general-purse processor may be a microprocessor. Optionally, the general-purpose processor may be any conventional processor, controller, microcontroller, or state machine. The processor may alternatively be implemented by a combination of computing apparatuses, such as a digital signal processor and a microprocessor, a plurality of microprocessors, one or more microprocessors with one digital signal processor core, or any other similar configuration.

The steps of the method or algorithm described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to the processor, so that the processor can read information from the storage medium and write information to the storage medium. Optionally, the storage medium may be integrated into a processor. The processor and the storage medium may be arranged in an ASIC, and the ASIC may be arranged in the terminal device. Optionally, the processor and the storage medium may be arranged in different components of the terminal device.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the embodiments of this application are described with reference to specific features, it is clear that various modifications and combinations may be made to the embodiments of this application without departing from the spirit and scope of the embodiments of this application. Correspondingly, the specification and accompanying drawings are merely example descriptions of the embodiments of this application that are defined by the appended claims, and are considered as any or all of modifications, variations, combinations, or equivalents that cover the scope of the embodiments of this application.

What is claimed is:

1. A communication method, wherein the method comprises:
    establishing, by a communication device, a first connection to a first network device and a second connection to a second network device, wherein the first connection and the second connection are used to process a first service; and
    sending, by the communication device, first information to the first network device based on the communication device determining that a second service needs to be processed, wherein the second service is different from the first service, wherein
    the first information is used to indicate the communication device to establish a third connection to a third network device, wherein the third connection is used to process the second service.

2. The method according to claim 1, wherein
    the first network device and the second network device are in a first network, and the third network device is in a second network; and
    the first service is a service of the first network, and the second service is a service of the second network.

3. The method according to claim 2, wherein the communication device comprises a first communication card and a second communication card, the first communication card registers with the first network, and the second communication card registers with the second network; and
    the first service corresponds to the first communication card, and the second service corresponds to the second communication card.

4. The method according to claim 1, wherein the first information comprises secondary cell group failure indication information or master cell group failure indication information.

5. The method according to claim 1, wherein the method further comprises:
    receiving, by the communication device, second information sent by the first network device, wherein the second information is used to indicate to disable the second connection;
    disabling, by the communication device, the second connection based on the second information; and
    establishing, by the communication device, the third connection to the third network device by using a transmitter chain corresponding to the second connection.

6. The method according to claim 1, wherein the first connection and the second connection are used to process the first service in a dual connectivity mode; and the method further comprises:

sending, by the communication device, third information to the first network device based on the communication device determining that the second service ends, wherein the third information is used to request to recover the dual connectivity mode.

7. The method according to claim 6, wherein the method further comprises:

receiving, by the communication device, fourth information sent by the first network device, wherein the fourth information is used to indicate to recover the dual connectivity mode; and recovering, by the communication device, the dual connectivity mode based on the fourth information.

8. A communication method, wherein the method comprises:

establishing, by a first network device, a first connection to a communication device, wherein the first connection and a second connection are used to process a first service, and the second connection is a connection between a second network device and the communication device; and receiving, by the first network device, first information sent by the communication device, wherein the first information is used to indicate the communication device to establish a third connection to a third network device, wherein the third connection is used to process a second service, and the second service is different from the first service.

9. The method according to claim 8, wherein the first network device and the second network device are in a first network, and the third network device is in a second network; and the first service is a service of the first network, and the second service is a service of the second network.

10. The method according to claim 9, wherein the communication device comprises a first communication card and a second communication card, the first communication card registers with the first network, and the second communication card registers with the second network; and the first service corresponds to the first communication card, and the second service corresponds to the second communication card.

11. The method according to claim 8, wherein the first information comprises secondary cell group failure indication information or master cell group failure indication information.

12. The method according to claim 8, wherein the method further comprises:

sending, by the first network device, second information to the communication device, wherein the second information is used to indicate to disable the second connection.

13. The method according to claim 8, wherein the first connection and the second connection are used to process the first service in a dual connectivity mode; and the method further comprises:

receiving, by the first network device, third information sent by the communication device, wherein the third information is used to request to recover the dual connectivity mode.

14. A communication apparatus, comprising:

a processor; and a memory having instructions stored thereon that, when executed by the processor, cause the communication apparatus to:

establish a first connection to a first network device and a second connection to a second network device, wherein the first connection and the second connection are used to process a first service; and send first information to the first network device in response to determining that a second service needs to be processed, wherein the second service is different from the first service, wherein the first information is used to indicate the communication apparatus to establish a third connection to a third network device, wherein the third connection is used to process the second service.

15. The communication apparatus according to claim 14, wherein the first network device and the second network device are in a first network, and the third network device is in a second network; and the first service is a service of the first network, and the second service is a service of the second network.

16. The communication apparatus according to claim 15, further comprising:

a first communication card configured to register with the first network; and a second communication card configured to register with the second network;

wherein the first service corresponds to the first communication card, and the second service corresponds to the second communication card.

17. The communication apparatus according to claim 14, wherein the first information comprises secondary cell group failure indication information or master cell group failure indication information.

18. The communication apparatus according to claim 14, wherein the communication apparatus is further caused to:

receive second information sent by the first network device, wherein the second information is used to indicate to disable the second connection; and disable the second connection based on the second information, and establish the third connection to the third network device by using a transmitter chain corresponding to the second connection.

19. The communication apparatus according to claim 14, wherein the first connection and the second connection are used to process the first service in a dual connectivity mode; and the communication apparatus is further caused to send third information to the first network device based on a determination that the second service ends, wherein the third information is used to request to recover the dual connectivity mode.

20. The communication apparatus according to claim 19, wherein the communication apparatus is further caused to:

receive fourth information sent by the first network device, wherein the fourth information is used to indicate to recover the dual connectivity mode; and recover the dual connectivity mode based on the fourth information.

\* \* \* \* \*